US009518558B2

(12) United States Patent
Baker et al.

(10) Patent No.: US 9,518,558 B2
(45) Date of Patent: *Dec. 13, 2016

(54) EFFICIENT WIND TURBINE BLADES, WIND TURBINE BLADE STRUCTURES, AND ASSOCIATED SYSTEMS AND METHODS OF MANUFACTURE, ASSEMBLY AND USE

(71) Applicant: Vestas Wind Systems A/S, Aarhus N (DK)

(72) Inventors: Myles L. Baker, Long Beach, CA (US); Cory P. Arendt, Huntingdon Beach, CA (US); Bernard G. Madrid, Huntingdon Beach, CA (US); Sheldon Vilhauer, Carson, CA (US)

(73) Assignee: Vestas Wind Systems A/S, Aarhus (DK)

( * ) Notice: Subject to any disclaimer, the term of this patent is extended or adjusted under 35 U.S.C. 154(b) by 618 days.

This patent is subject to a terminal disclaimer.

(21) Appl. No.: 13/951,727

(22) Filed: Jul. 26, 2013

(65) Prior Publication Data

US 2014/0154091 A1 Jun. 5, 2014

Related U.S. Application Data

(63) Continuation of application No. 13/154,384, filed on Jun. 6, 2011, now Pat. No. 8,506,258, which is a
(Continued)

(51) Int. Cl.
*F03D 1/06* (2006.01)
*F03D 1/00* (2006.01)
(Continued)

(52) U.S. Cl.
CPC ............. *F03D 1/0675* (2013.01); *F03D 1/001* (2013.01); *F03D 1/0683* (2013.01);
(Continued)

(58) Field of Classification Search
CPC ............ B64C 1/065; B64C 3/18; B64C 3/185; F03D 1/0675; F03D 1/065; F03D 3/062; F03D 3/061
(Continued)

(56) References Cited

U.S. PATENT DOCUMENTS 1,555,409 A 9/1925 Gilmore
1,827,181 A 10/1931 Alfaro
(Continued)

FOREIGN PATENT DOCUMENTS

DE 102009040515 A1 3/2011
EP 1184566 A1 3/2002
(Continued)

OTHER PUBLICATIONS

European Search Report and Written Opinion for European Patent Application No. 09831246, Applicant: Vestas Wind Systems A/S, mailed Nov. 27, 2015, 9 pages.
(Continued)

*Primary Examiner* — Richard Edgar
(74) *Attorney, Agent, or Firm* — Perkins Coie LLP

(57) ABSTRACT

Wind turbine systems and methods are disclosed herein. A representative system includes a wind turbine blade having an inner region that has an internal load-bearing truss structure, and an outer region that has an internal, non-truss load-bearing structure. In particular embodiments, the truss structure can include a triangular arrangement of spars, and/or can include truss attachment members that connect components of the truss without the use of holes in the spars. Spars can be produced from a plurality of pultruded composite members laminated together in longitudinally extending portions. The longitudinally extending portions can be connected at joints that interleave projections and recesses of each of the spar portions. The blades can include fan-
(Continued)

shaped transitions at a hub attachment portion, formed by laminated layers and/or a combination of laminated layers and transition plates.

18 Claims, 26 Drawing Sheets

Related U.S. Application Data continuation of application No. PCT/US2009/066875, filed on Dec. 4, 2009.

(60) Provisional application No. 61/120,338, filed on Dec. 5, 2008, provisional application No. 61/220,187, filed on Jun. 24, 2009, provisional application No. 61/271,179, filed on Jul. 17, 2009.

(51) Int. Cl.
*B29L 31/08* (2006.01)
*B29D 99/00* (2010.01)

(52) U.S. Cl.
CPC ..... *B29D 99/0028* (2013.01); *B29L 2031/085* (2013.01); *F05B 2240/30* (2013.01); *Y02E 10/721* (2013.01); *Y02P 70/523* (2015.11); *Y10T 29/49316* (2015.01); *Y10T 29/49337* (2015.01); *Y10T 29/49339* (2015.01); *Y10T 156/10* (2015.01)

(58) Field of Classification Search
USPC ................................. 416/226, 230, 229 R
See application file for complete search history.

(56) References Cited

U.S. PATENT DOCUMENTS

| | | | |
|---|---|---|---|
| 1,942,148 A | 1/1934 | Ragsdale | |
| 2,116,953 A | 5/1938 | Sambraus | |
| 2,388,485 A | 11/1945 | Jensen et al. | |
| 2,448,362 A * | 8/1948 | Earhart | B64C 1/065 |
| | | | 280/495 |
| 4,130,380 A | 12/1978 | Kaiser | |
| 4,295,790 A | 10/1981 | Eggert, Jr. | |
| 4,339,230 A | 7/1982 | Hill | |
| 4,389,162 A | 6/1983 | Doellinger et al. | |
| 4,412,784 A | 11/1983 | Wackerle et al. | |
| 4,643,647 A | 2/1987 | Perry | |
| 5,375,324 A | 12/1994 | Wallace et al. | |
| 5,439,353 A | 8/1995 | Cook et al. | |
| 5,476,704 A | 12/1995 | Kohler | |
| 5,509,783 A | 4/1996 | Jones et al. | |
| 6,237,873 B1 | 5/2001 | Amaoka et al. | |
| 6,561,459 B2 | 5/2003 | Amaoka et al. | |
| 6,735,916 B2 | 5/2004 | Peshkam et al. | |
| 7,118,338 B2 | 10/2006 | Moroz et al. | |
| 7,153,090 B2 | 12/2006 | DeLeonardo et al. | |
| 7,163,378 B2 | 1/2007 | Kildegaard | |
| 7,179,059 B2 | 2/2007 | Sorensen et al. | |
| 7,198,471 B2 | 4/2007 | Gunneskov et al. | |
| 7,322,798 B2 | 1/2008 | Cairo | |
| 7,334,989 B2 | 2/2008 | Arelt | |
| 7,351,040 B2 | 4/2008 | Livingston et al. | |
| 7,357,726 B2 | 4/2008 | Thorning | |
| 7,381,029 B2 | 6/2008 | Moroz | |
| 7,393,184 B2 | 7/2008 | Cairo | |
| 7,427,189 B2 | 9/2008 | Eyb et al. | |
| 7,438,533 B2 | 10/2008 | Eyb et al. | |
| 7,470,114 B2 | 12/2008 | Bonnet | |
| 7,494,324 B2 | 2/2009 | Hibbard | |
| 7,503,375 B2 | 3/2009 | Schueren | |
| 7,503,752 B2 | 3/2009 | Gunneskov et al. | |
| 7,517,198 B2 | 4/2009 | Baker et al. | |
| 7,521,105 B2 | 4/2009 | Bech et al. | |
| 7,654,799 B2 | 2/2010 | Eyb | |
| 7,726,962 B2 | 6/2010 | Aramburu et al. | |
| 7,729,100 B2 | 6/2010 | Llorente Gonzalez et al. | |
| 7,731,882 B2 | 6/2010 | Bech et al. | |
| 7,740,453 B2 | 6/2010 | Zirin et al. | |
| 7,811,063 B2 | 10/2010 | Bonnet | |
| 7,883,321 B2 | 2/2011 | Bertelsen | |
| 7,891,947 B2 | 2/2011 | Chen et al. | |
| 7,891,948 B2 | 2/2011 | Baker et al. | |
| 7,891,949 B2 | 2/2011 | Baker et al. | |
| 7,891,950 B2 | 2/2011 | Baker et al. | |
| 7,895,746 B2 | 3/2011 | Bech et al. | |
| 7,901,188 B2 | 3/2011 | Llorente Gonzalez et al. | |
| 7,980,840 B2 | 7/2011 | Burchardt et al. | |
| 7,988,423 B2 | 8/2011 | Hancock | |
| 8,007,624 B2 | 8/2011 | Stiesdal | |
| 8,012,299 B2 | 9/2011 | Hancock | |
| 8,034,278 B2 | 10/2011 | Lopez | |
| 8,043,065 B2 | 10/2011 | Kyriakides | |
| 8,079,818 B2 | 12/2011 | Burchardt et al. | |
| 8,105,045 B2 | 1/2012 | Stewart | |
| 8,128,854 B2 | 3/2012 | Bech et al. | |
| 8,171,633 B2 | 5/2012 | Zirin et al. | |
| 8,177,514 B2 | 5/2012 | Hibbard | |
| 8,177,515 B2 | 5/2012 | Hibbard | |
| 8,191,255 B2 | 6/2012 | Kristensen et al. | |
| 8,206,531 B2 | 6/2012 | Portoles | |
| 8,221,085 B2 | 7/2012 | Livingston et al. | |
| 8,226,866 B2 | 7/2012 | Arelt | |
| 8,382,440 B2 | 2/2013 | Baker et al. | |
| 8,475,133 B2 | 7/2013 | Baker et al. | |
| 8,480,370 B2 | 7/2013 | Baker et al. | |
| 8,500,408 B2 | 8/2013 | Baker et al. | |
| 8,500,409 B2 * | 8/2013 | Baker et al. | F03D 1/0675 |
| | | | 416/226 |
| 8,506,258 B2 | 8/2013 | Baker et al. | |
| 2005/0180853 A1 | 8/2005 | Grabau et al. | |
| 2005/0180854 A1 | 8/2005 | Grabau et al. | |
| 2006/0083907 A1 | 4/2006 | Bech et al. | |
| 2006/0127222 A1 | 6/2006 | Arelt | |
| 2006/0225278 A1 | 10/2006 | Lin et al. | |
| 2006/0247901 A1 | 11/2006 | Thorning | |
| 2007/0036659 A1 | 2/2007 | Hibbard | |
| 2007/0107220 A1 | 5/2007 | Bakhuis et al. | |
| 2007/0189903 A1 | 8/2007 | Eyb | |
| 2007/0217918 A1 | 9/2007 | Baker et al. | |
| 2007/0251090 A1 | 11/2007 | Breugel et al. | |
| 2008/0069699 A1 | 3/2008 | Bech | |
| 2008/0145231 A1 | 6/2008 | Llorente Gonsales et al. | |
| 2008/0145615 A1 | 6/2008 | Jacobsen et al. | |
| 2008/0159871 A1 | 7/2008 | Bech | |
| 2008/0181781 A1 | 7/2008 | Livingston et al. | |
| 2008/0206062 A1 | 8/2008 | Sanz Pascual et al. | |
| 2008/0277053 A1 | 11/2008 | Stiesdal | |
| 2009/0035517 A1 | 2/2009 | Bech | |
| 2009/0140527 A1 | 6/2009 | Pawar et al. | |
| 2009/0146433 A1 | 6/2009 | Althoff et al. | |
| 2009/0148300 A1 | 6/2009 | Driver et al. | |
| 2009/0196756 A1 | 8/2009 | Althoff | |
| 2009/0208341 A1 | 8/2009 | Llorente Gonzalez et al. | |
| 2009/0220747 A1 | 9/2009 | Karem | |
| 2009/0246033 A1 | 10/2009 | Rudling | |
| 2009/0317585 A1 | 12/2009 | Bech | |
| 2010/0062238 A1 | 3/2010 | Doyle et al. | |
| 2010/0068065 A1 | 3/2010 | Jensen | |
| 2010/0071209 A1 | 3/2010 | Moller | |
| 2010/0090472 A1 | 4/2010 | Berthelsen | |
| 2010/0104447 A1 | 4/2010 | Eyb | |
| 2010/0122442 A1 | 5/2010 | Kirkpatrick et al. | |
| 2010/0132884 A1 | 6/2010 | Baehmann et al. | |
| 2010/0135817 A1 | 6/2010 | Wirt et al. | |
| 2010/0136278 A1 | 6/2010 | Cadd et al. | |
| 2010/0143145 A1 | 6/2010 | Jones | |
| 2010/0143147 A1 | 6/2010 | Akhtar et al. | |
| 2010/0166998 A1 | 7/2010 | Bannister et al. | |
| 2010/0226775 A1 | 9/2010 | Hartman | |
| 2010/0239426 A1 | 9/2010 | Westergaard | |
| 2010/0260611 A1 | 10/2010 | Rudling | |
| 2010/0260612 A1 | 10/2010 | Vasudeva et al. | |

(56) References Cited

U.S. PATENT DOCUMENTS

| | | |
|---|---|---|
| 2010/0272570 A1 | 10/2010 | Arocena De La Rua et al. |
| 2010/0304170 A1 | 12/2010 | Frederiksen |
| 2010/0314028 A1 | 12/2010 | Hedges et al. |
| 2011/0020131 A1 | 1/2011 | Petersen et al. |
| 2011/0031758 A1 | 2/2011 | Mitsuoka et al. |
| 2011/0031759 A1 | 2/2011 | Mitsuoka et al. |
| 2011/0037190 A1 | 2/2011 | Stiesdal |
| 2011/0044820 A1 | 2/2011 | Stenbaek Nielsen et al. |
| 2011/0049770 A1 | 3/2011 | Stiesdal |
| 2011/0052403 A1 | 3/2011 | Kawasetsu et al. |
| 2011/0073237 A1 | 3/2011 | Rajasingam |
| 2011/0084496 A1 | 4/2011 | Kuroiwa |
| 2011/0091326 A1 | 4/2011 | Hancock |
| 2011/0091684 A1 | 4/2011 | Holloway |
| 2011/0097211 A1 | 4/2011 | Rudling |
| 2011/0103962 A1 | 5/2011 | Hayden et al. |
| 2011/0103964 A1 | 5/2011 | Bech |
| 2011/0114252 A1 | 5/2011 | Partington et al. |
| 2011/0135485 A1 | 6/2011 | Wang |
| 2011/0142663 A1 | 6/2011 | Gill |
| 2011/0146896 A1 | 6/2011 | Schibsbye |
| 2011/0158788 A1 | 6/2011 | Bech et al. |
| 2011/0171034 A1 | 7/2011 | Whiter |
| 2011/0200444 A1 | 8/2011 | Garcia |
| 2011/0229336 A1 | 9/2011 | Richter et al. |
| 2011/0243750 A1 | 10/2011 | Gruhn et al. |
| 2012/0067515 A1 | 3/2012 | Dahl et al. |
| 2012/0211637 A1 | 8/2012 | Christiansen et al. |
| 2014/0037455 A1 | 2/2014 | Dahl et al. |
| 2014/0154091 A1 | 6/2014 | Baker et al. |
| 2015/0369212 A1 | 12/2015 | Baker et al. |

FOREIGN PATENT DOCUMENTS

| | | |
|---|---|---|
| EP | 1584817 | 10/2005 |
| EP | 1707805 A2 | 10/2006 |
| EP | 1806285 | 7/2007 |
| EP | 1878915 | 1/2008 |
| EP | 1965074 A2 | 9/2008 |
| EP | 2033769 A1 | 3/2009 |
| EP | 2264310 A2 | 12/2010 |
| EP | 2368699 A1 | 9/2011 |
| FR | 2588822 | 4/1987 |
| GB | 466665 | 6/1937 |
| GB | 582527 A | 11/1946 |
| GB | 2254382 | 10/1992 |
| GB | 2477847 A | 8/2011 |
| JP | 2005299620 | 10/2005 |
| NL | 8800386 | 9/1989 |
| WO | WO-2004050337 A1 | 6/2004 |
| WO | WO 2004078442 A1 | 9/2004 |
| WO | WO-2004078461 A1 | 9/2004 |
| WO | WO-2004078465 A1 | 9/2004 |
| WO | WO-2005064156 | 7/2005 |
| WO | WO-2006002621 | 1/2006 |
| WO | WO-2006005944 | 1/2006 |
| WO | WO-2006016089 A1 | 2/2006 |
| WO | WO-2006061617 | 6/2006 |
| WO | WO-2006082479 A1 | 8/2006 |
| WO | WO-2009059604 A1 | 5/2009 |
| WO | WO-2010065928 A1 | 6/2010 |
| WO | WO-2010135737 A1 | 11/2010 |
| WO | WO-2010136432 A1 | 12/2010 |
| WO | WO-2011117546 A1 | 9/2011 |

OTHER PUBLICATIONS

Nettles A., "Basic Mechanics of Laminated Composite Plates," NASA Reference Publication 1351, Marshall Space FlightCenter, Alabama, Oct. 1994, 104 pages.

European Search Report for European Patent Application No. 09831246.5, Applicant: Vestas Wind Systems A/S, mailed Aug. 10, 2015, 7 pages.

Gardiner, Ginger, "Wind Blade Manufacturing, Part I: M and P Innovations optimize production," Composite World, http://www.compositesworld.com/articles/wind-blade-manufacturing-part-i-m-and-p-innovations-optimize-production, Oct. 21, 2008, 5 pages.

International Search Report and Written Opinion for International Application No. PCT/US2009/066875, Applicant: Modular Wind Energy, Inc., mailed Apr. 12, 2010, 14 pages.

"Wind Turbine Design;" Wikipedia, the free encyclopedia; <http://en.wikipedia.org/wiki/Wind_turbine_design> (accessed: Mar. 9, 2007}; pp. 1-8.

"Wind Turbine;" Wikipedia, the free encyclopedia; <http://en.wikipedia.org/wiki/Wind_turbine> [accessed: Mar. 9. 2007}; pp. 1-11.

Weber, Friedel; "How a High-Performance Sailplane is Manufactured;" DG Flugzeugbau GmbH; <http://dg-flugzeugbau.de/flugzeug-bauen-e.html> [accessed: Oct. 22, 2008]; pp. 1-10.

* cited by examiner

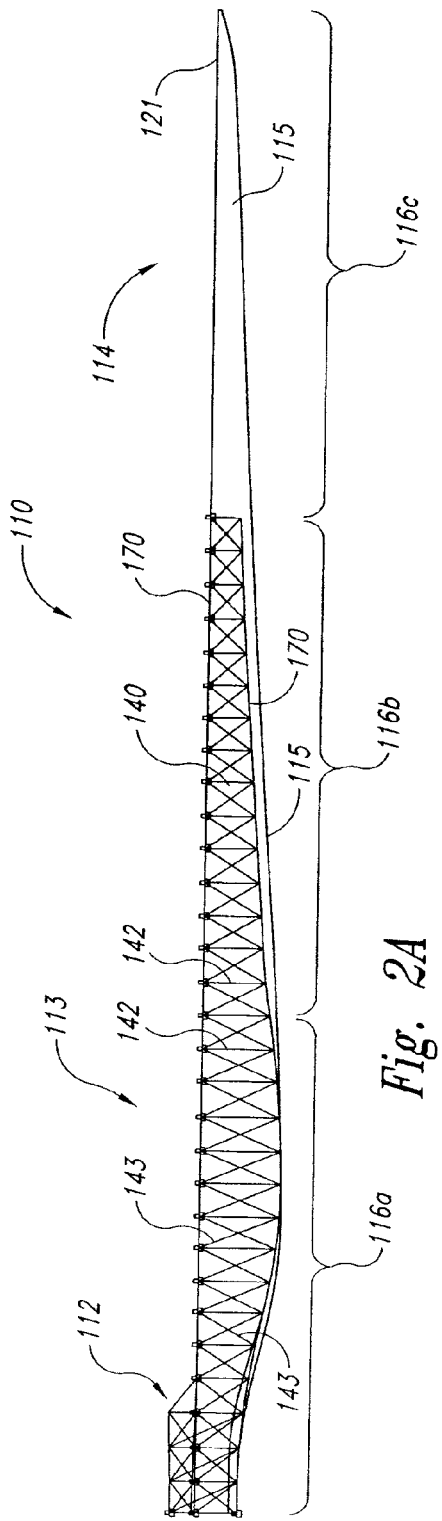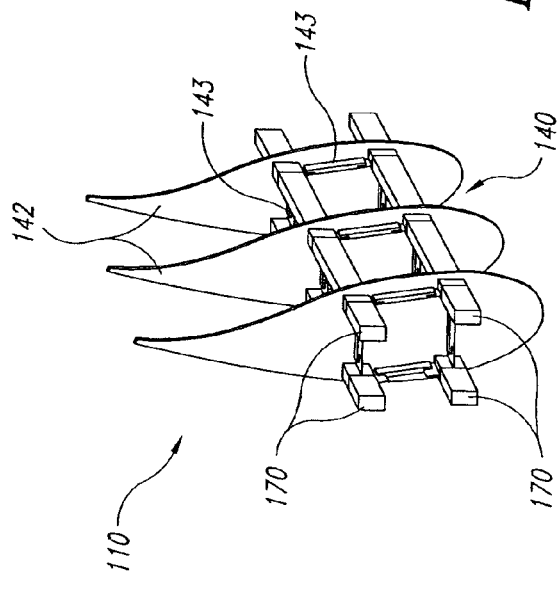

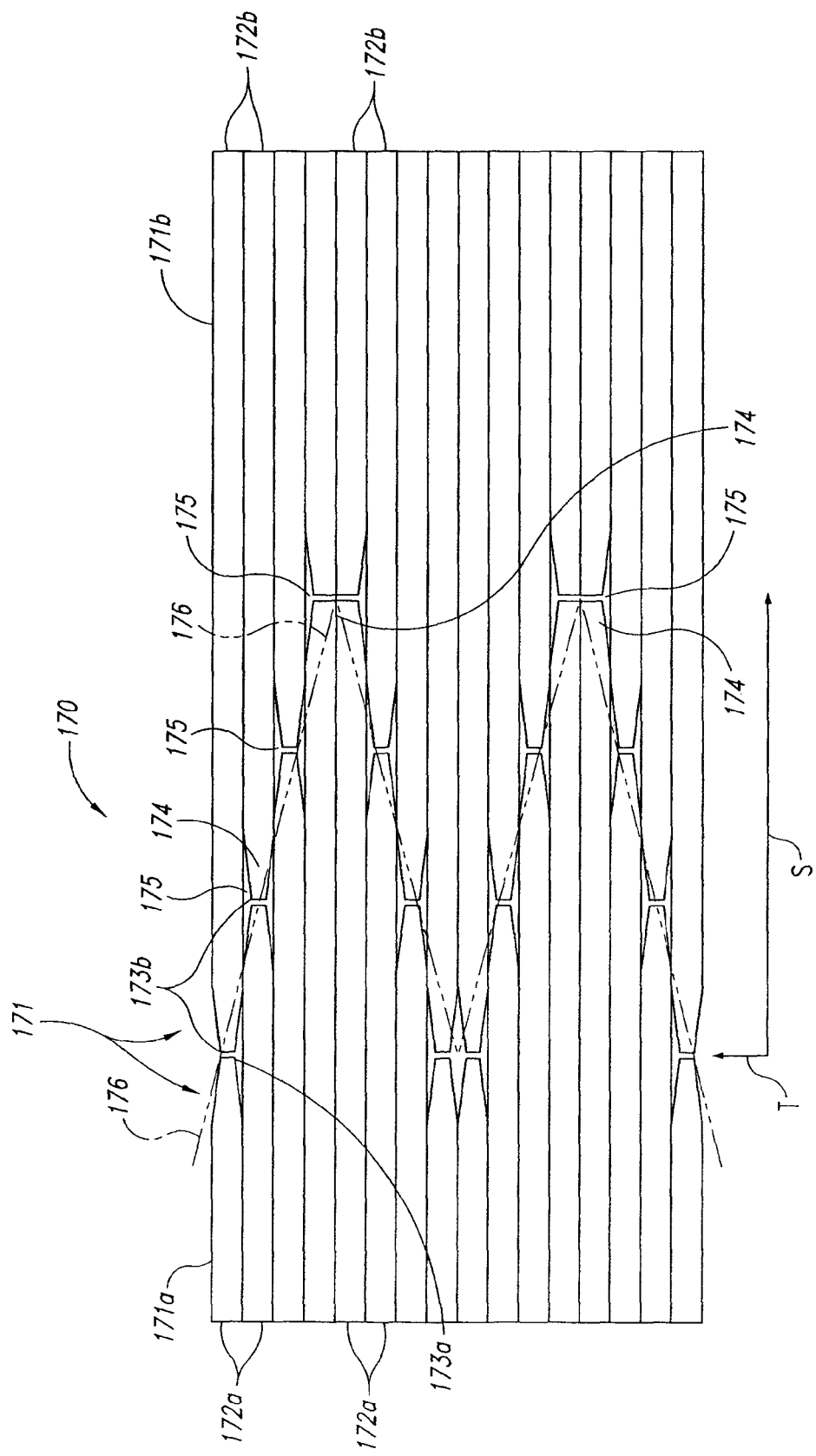

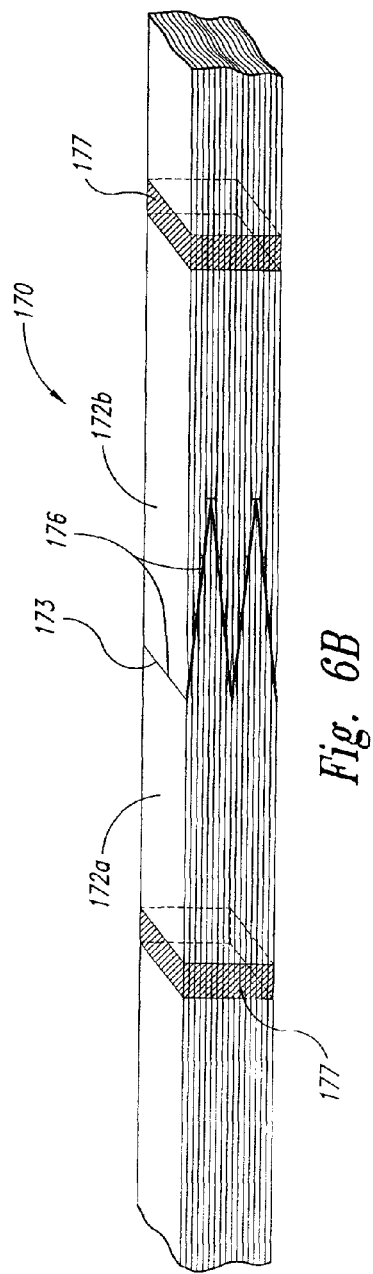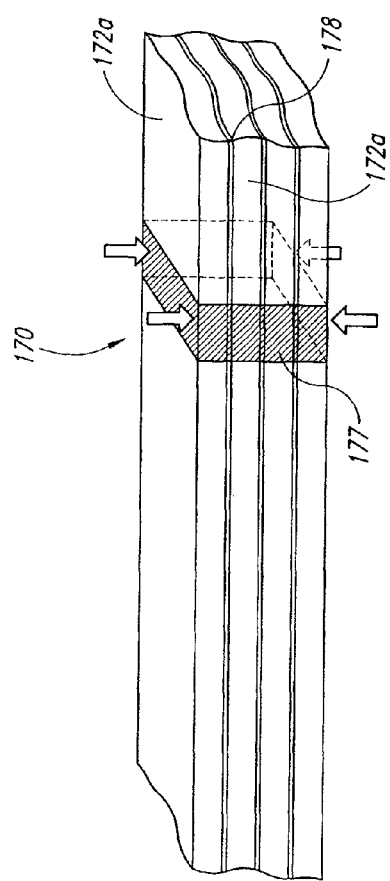
Fig. 6B
Fig. 6C

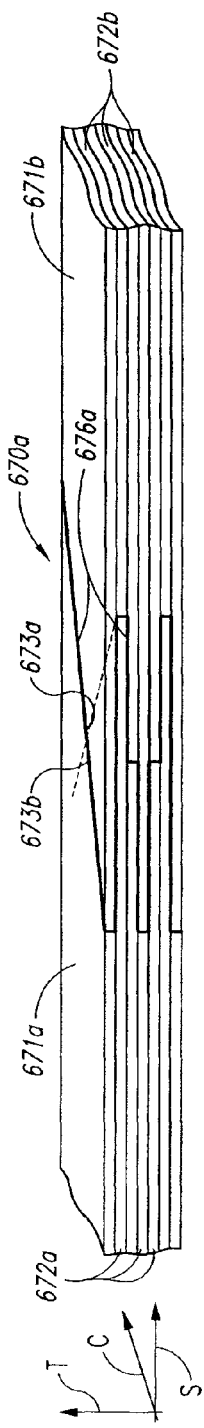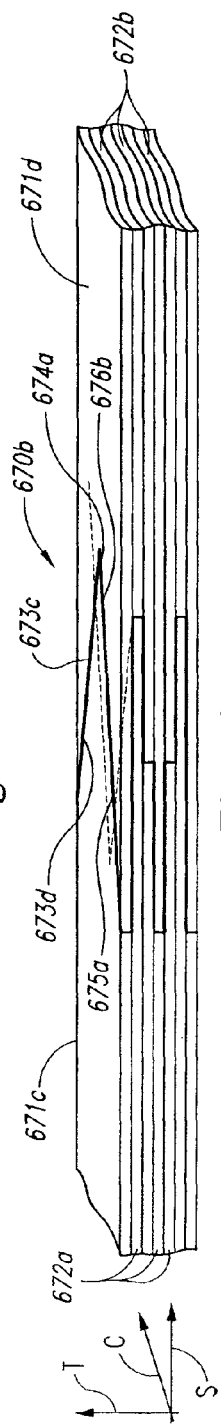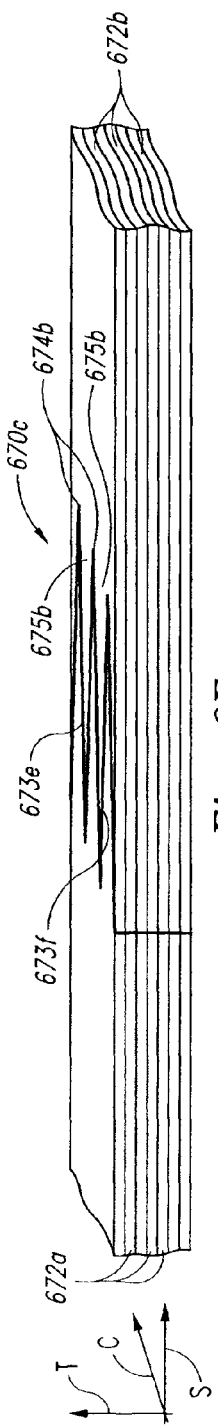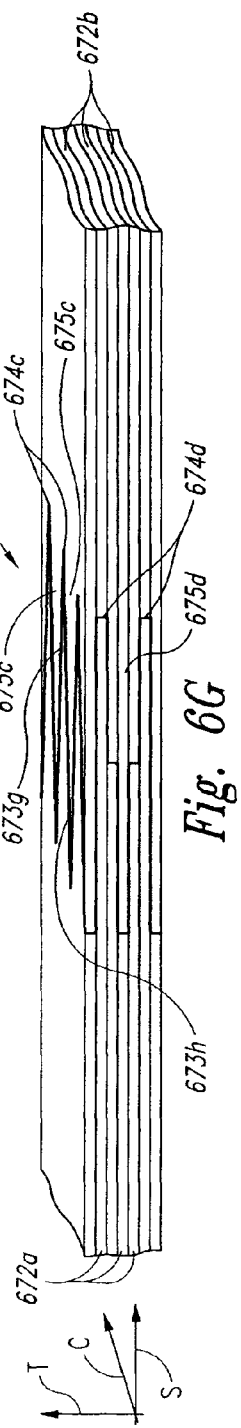

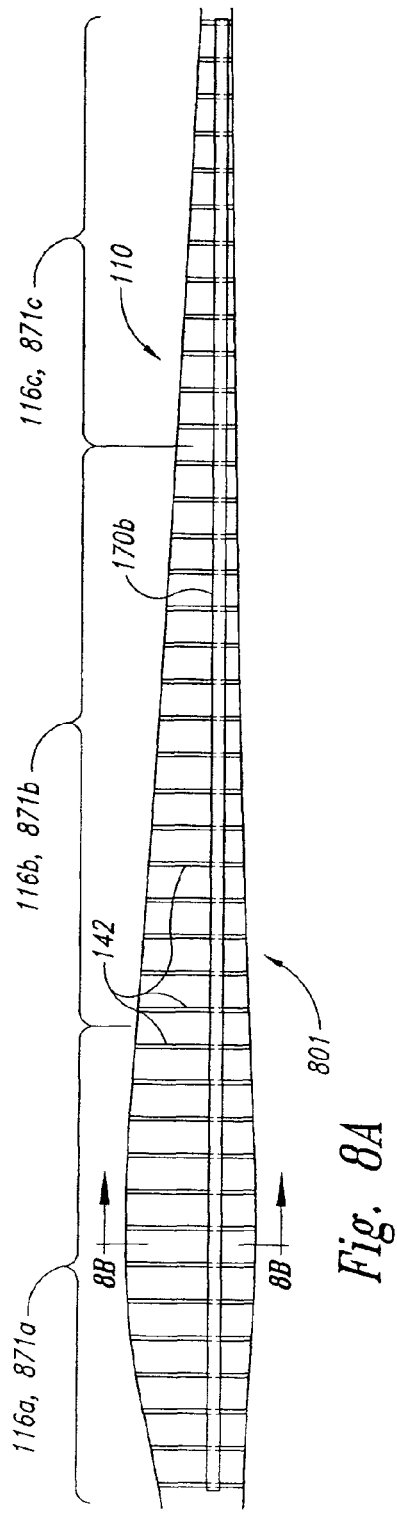
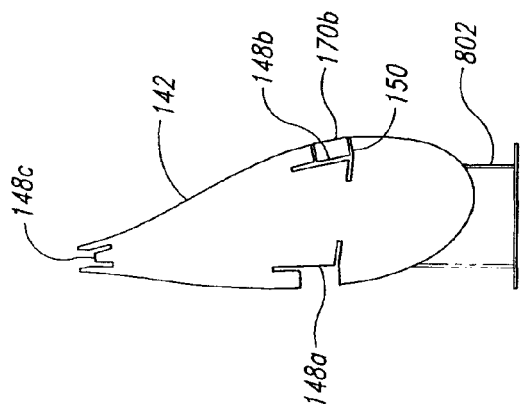
Fig. 8A
Fig. 8B

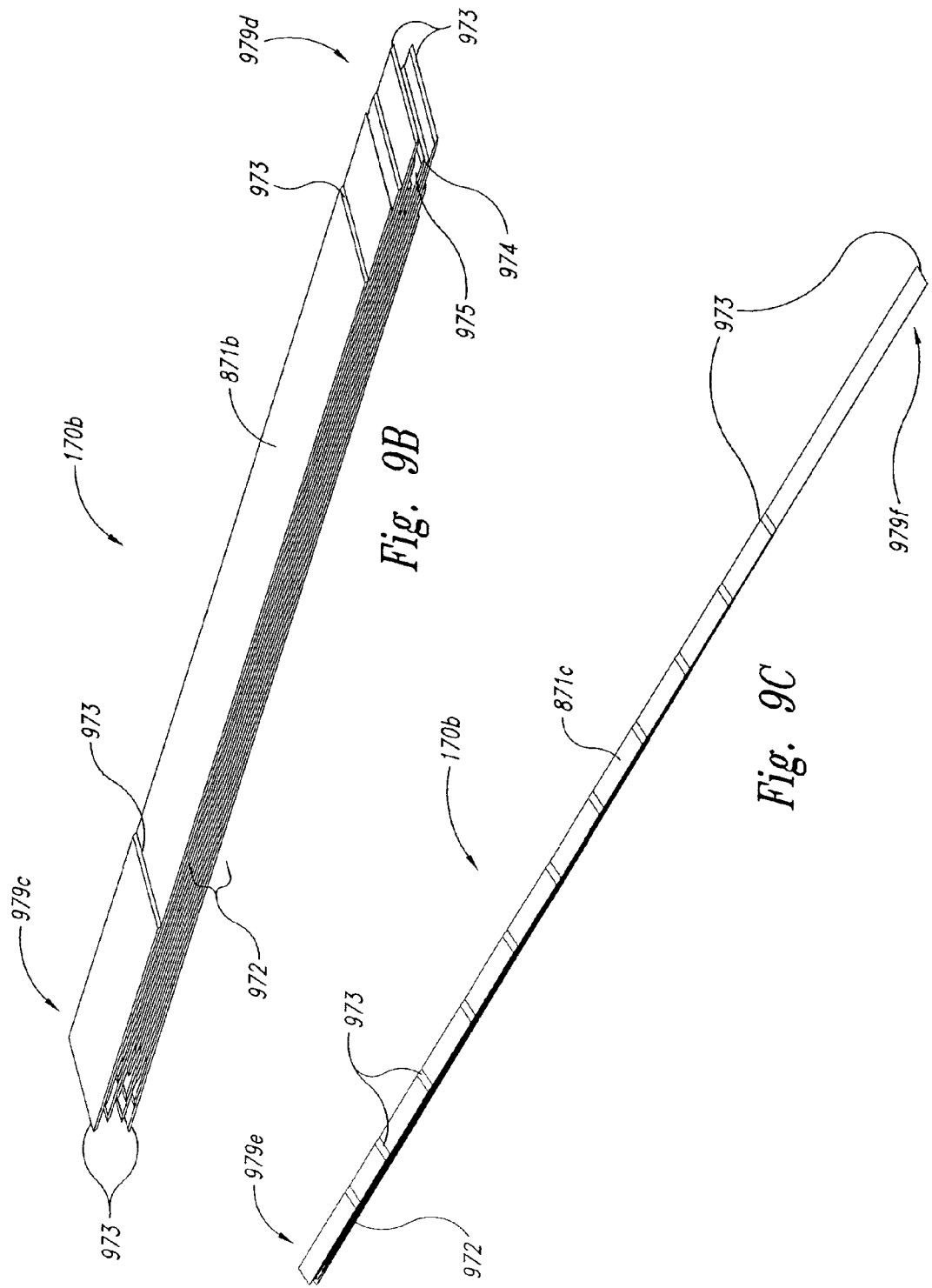

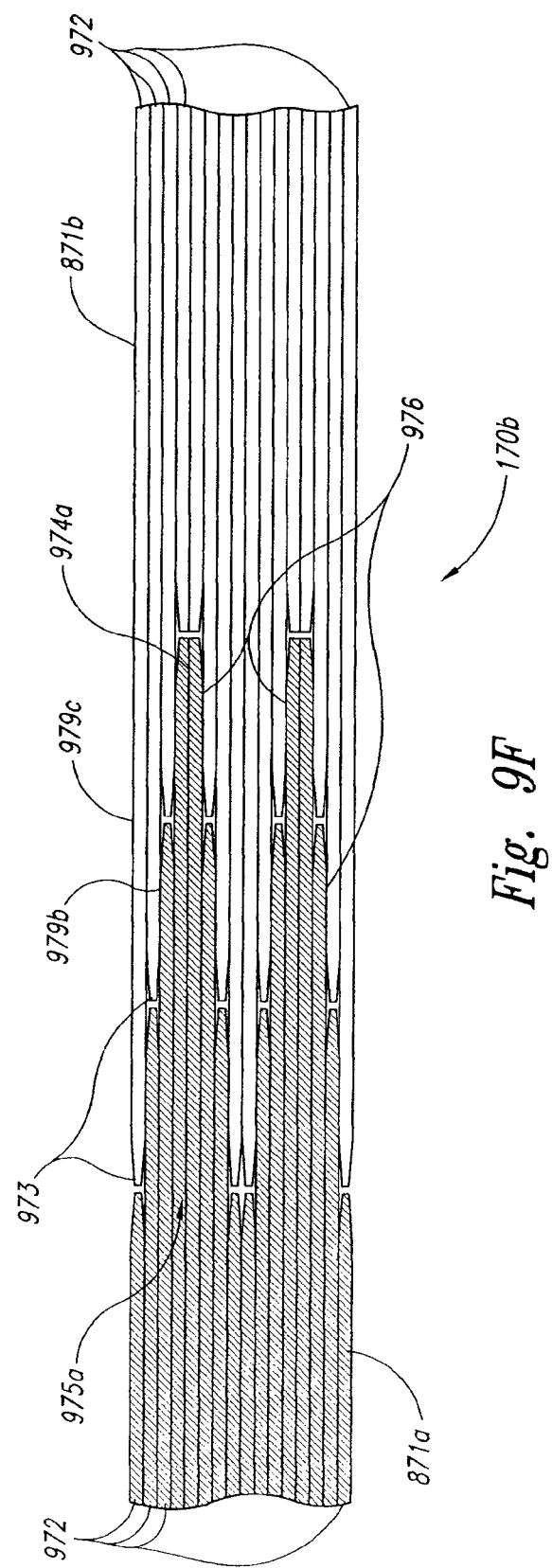

EFFICIENT WIND TURBINE BLADES, WIND TURBINE BLADE STRUCTURES, AND ASSOCIATED SYSTEMS AND METHODS OF MANUFACTURE, ASSEMBLY AND USE

CROSS REFERENCE TO RELATED APPLICATIONS

The present application is a continuation of U.S. patent application Ser. No. 13/154,384, filed Jun. 6, 2011, entitled "EFFICIENT WIND TURBINE BLADES, WIND TURBINE BLADE STRUCTURES, AND ASSOCIATED SYSTEMS AND METHODS OF MANUFACTURE, ASSEMBLY AND USE," which is a continuation of International Application Serial No. PCT/US2009/066875, filed Dec. 4, 2009, entitled EFFICIENT WIND TURBINE BLADES, WIND TURBINE BLADE STRUCTURES, AND ASSOCIATED SYSTEMS AND METHODS OF MANUFACTURE, ASSEMBLY AND USE," which claims priority to the following U.S. Provisional Patent Applications, each of which is incorporated herein in its entirety by reference: Ser. No. 61/120,338, filed Dec. 5, 2008; Ser. No. 61/220,187, filed Jun. 24, 2009; and Ser. No. 61/271,179, filed Jul. 17, 2009.

TECHNICAL FIELD

The present disclosure is directed generally to efficient wind turbine blades and wind turbine blade structures, including lightweight, segmented and/or otherwise modular wind turbine blades, and associated systems and methods of manufacture, assembly, and use.

BACKGROUND

As fossil fuels become scarcer and more expensive to extract and process, energy producers and users are becoming increasingly interested in other forms of energy. One such energy form that has recently seen a resurgence is wind energy. Wind energy is typically harvested by placing a multitude of wind turbines in geographical areas that tend to experience steady, moderate winds. Modern wind turbines typically include an electric generator connected to one or more wind-driven turbine blades, which rotate about a vertical axis or a horizontal axis.

In general, larger (e.g., longer) wind turbine blades produce energy more efficiently than do short blades. Accordingly, there is a desire in the wind turbine blade industry to make blades as long as possible. However, long blades create several challenges. For example, long blades are heavy and therefore have a significant amount of inertia, which can reduce the efficiency with which the blades produce energy, particularly at low wind conditions. In addition, long blades are difficult to manufacture and in many cases are also difficult to transport. Accordingly, a need remains for large, efficient, lightweight wind turbine blades, and suitable methods for transporting and assembling such blades.

BRIEF DESCRIPTION OF THE DRAWINGS

FIG. 2A is a partially schematic, side elevation view of a wind turbine blade having a hybrid truss/non-truss structure in accordance with an embodiment of the disclosure.

FIG. 2B is an enlarged illustration of a portion of the wind turbine blade shown in FIG. 2A.

FIG. 6A is a partially schematic, side elevation view of a spar having multiple portions, each with layers that terminate at staggered positions to form a non-monotonically varying bond line.

FIG. 6B is an illustration of an embodiment of the structure shown in FIG. 6A with clamps positioned to prevent or limit delamination in accordance with an embodiment of the disclosure.

FIG. 6C is an enlarged illustration of a portion of the spar shown in FIG. 6B.

FIGS. 6D-6G are partially schematic illustrations of spars having joints configured in accordance with further embodiments of the disclosure.

FIG. 8A is a partially schematic, side elevation view of a wind turbine blade structure subassembly configured in accordance with an embodiment of the disclosure, and FIG. 8B is an enlarged, partially schematic end view of a rib from the subassembly of FIG. 8A.

FIGS. 9A-9C are partially schematic, not-to-scale isometric views of inboard, midboard, and outboard spar portions configured in accordance with embodiments of the disclosure.

FIG. 9F is a partially schematic, side elevation view of a joint between adjacent end portions of the inboard spar portion and the midboard spar portion of FIGS. 9A and 9B, configured in accordance with several embodiments of the disclosure.

DETAILED DESCRIPTION

The present disclosure is directed generally to efficient wind turbine blades, wind turbine blade spars and other structures, and associated systems and methods of manufacture, assembly, and use. Several details describing structures and/or processes that are well-known and often associated with wind turbine blades are not set forth in the following description to avoid unnecessarily obscuring the description of the various embodiments of the disclosure. Moreover, although the following disclosure sets forth several embodiments, several other embodiments can have different configurations or different components than those described in this section. In particular, other embodiments may have additional elements or may lack one or more of the elements described below with reference to FIGS. 1-16. In FIGS. 1-16, many of the elements are not drawn to scale for purposes of clarity and/or illustration.

Figure 1:
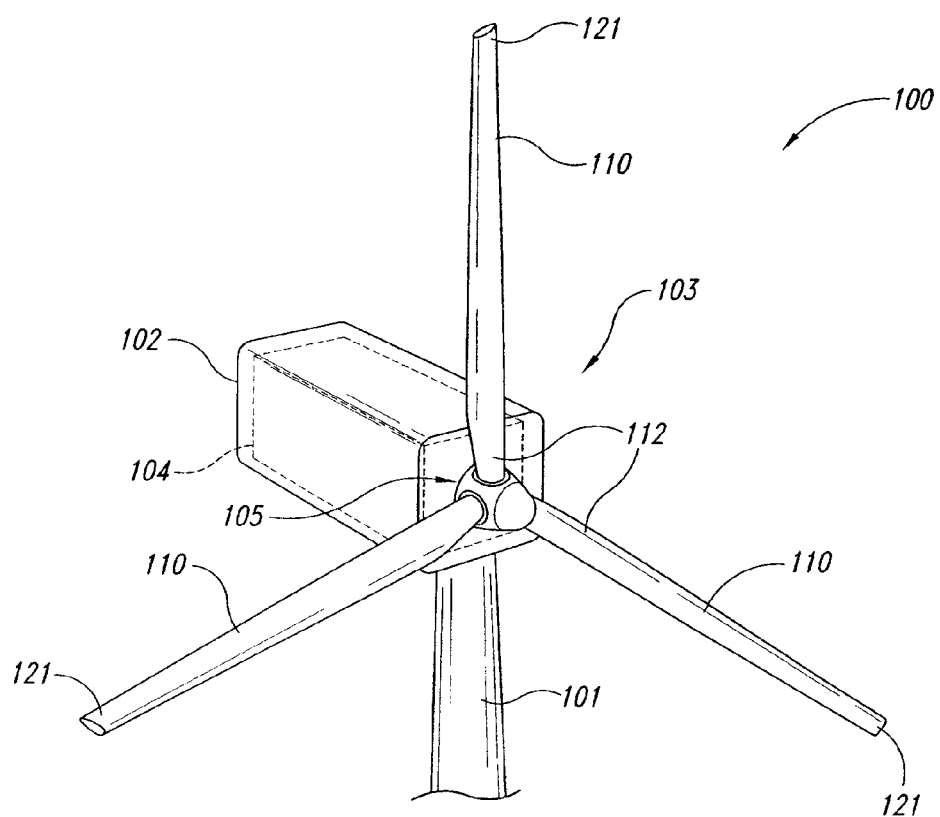
FIG. 1 is a partially schematic, isometric illustration of a wind turbine system having blades configured in accordance with an embodiment of the disclosure.

FIG. 1 is a partially schematic, isometric illustration of an overall system 100 that includes a wind turbine 103 having blades 110 configured in accordance with an embodiment of the disclosure. The wind turbine 103 includes a tower 101 (a portion of which is shown in FIG. 1), a housing or nacelle 102 carried at the top of the tower 101, and a generator 104 positioned within the housing 102. The generator 104 is connected to a shaft or spindle having a hub 105 that projects outside the housing 102. The blades 110 each include a hub attachment portion 112 at which the blades 110 are connected to the hub 105, and a tip 121 positioned radially or longitudinally outwardly from the hub 105. In an embodiment shown in FIG. 1, the wind turbine 103 includes three blades connected to a horizontally-oriented shaft. Accordingly, each blade 110 is subjected to cyclically varying loads as it rotates between the 12:00, 3:00, 6:00 and 9:00 positions, because the effect of gravity is different at each position. In other embodiments, the wind turbine 103 can include other numbers of blades connected to a horizontally-oriented shaft, or the wind turbine 103 can have a shaft with a vertical or other orientation. In any of these embodiments, the blades 110 can have structures configured in accordance with the arrangements described in further detail below with reference to FIGS. 2A-16.

FIG. 2A is a partially schematic, partially cut-away illustration of one of the blades 110 shown in FIG. 1. The blade 110 extends outwardly in a radial or longitudinal direction from an inner region 113 that includes the hub attachment portion 112, to an outer region 114 that includes the tip 121. The hub attachment portion 112 can include one or more hub attachment elements, e.g., a ring with a bolt circle, one or more bearings, fasteners, and/or other elements. The internal structure of the blade 110 can be different at the inner region 113 than at the outer region 114. For example, the inner region 113 can include a truss structure 140 formed from a plurality of longitudinally or radially extending beams or spars 170, chordwise extending ribs 142, and truss members 143 connected among the spars 170 and the ribs 142. The truss structure 140 can be surrounded by a skin 115 (most of which is removed in FIG. 2A) that presents a smooth, aerodynamic surface to the wind during operation. The outer region 114 can include a non-truss structure, which will be described in further detail later with reference to FIG. 4. As used herein, the term "truss structure" refers generally to a load-bearing structure that includes generally straight, slender members forming closed shapes or units (e.g., triangular units). The term "non-truss structure" refers generally to a load-bearing structure having an arrangement that does not rely on, or does not primarily rely on, straight slender members forming closed-shape units for strength. Such structures may include, for example, monocoque and semi-monocoque structures. Accordingly, the skin 115 of the inner region 113 is generally non-load bearing, and the skin 115 at the outer region 114 is load bearing.

In a particular aspect of an embodiment shown in FIG. 2A, the blade 110 includes three segments 116, shown as a first segment 116a, a second segment 116b, and a third segment 116c. The first and second segments 116a, 116b can each have the truss structure 140 described above, and the third segment 116c can have a non-truss structure. Accordingly, the blade 110 can have a truss structure for the inner two-thirds of its span, and a non-truss structure for the outer one-third. In other embodiments, these values can be different, depending, for example, on the size, shape and/or other characteristics of the blade 110. For example, in one embodiment, the truss structure 140 extends outwardly over a majority of the span or length of the blade 110, but by an amount less than or greater than two-thirds of the length. The segments 116 can be manufactured individually and then connected to each other at a manufacturing facility, or at an end user installation site. For example, the segments 116 can each be sized to fit in a 53-foot or other suitably sized container for shipment. In other embodiments, one or more of the segments (e.g., the first segment 116a and the second segment 116b) can be built entirely at the installation site.

In still further embodiments, the blade 110 can include other numbers of segments 116 (e.g., two or more segments). In any of these embodiments, individual segments 116 can include ribs 142, truss members 143, and portions of the spars 170 that extend for the length of the segment 116. The segments 116 can be joined to each other by joining adjacent spar portions, e.g., as discussed later with reference to FIGS. 6A-6C and 8A-16. For example, the first segment 116a can include one or more first spar segments that are joined to corresponding second spar segments of the second segment 116b. The resulting joined spars can extend along corresponding generally smooth, continuous longitudinal axes. In any of these embodiments, the skin 115 can be laid up on the truss structure 140 with or without forming a joint at the interface between adjacent segments 116. For example, the spar portions can be joined at a location between two neighboring ribs 142, and a relatively small panel of skin 115 can be laid over the spar joint and the two neighboring ribs 142. The neighboring ribs 142 can be spaced apart by about one meter in one embodiment, and by other values in other embodiments. Larger panels of the skin 115 can be laid inboard and outboard of the small panel. In another embodiment, the skin 115 can have no spanwise joints and can be laid up as a continuous element. In any of these embodiments, the skin 115 can be attached (e.g., adhesively bonded or ultrasonically bonded) to the ribs 142 alone, or to the ribs 142 and the spars 170. In any of these embodiments, the truss structure 140 can serve as primary structure for carrying shear and bending loads in the blade 110.

FIG. 2B is a partially schematic, isometric illustration of a portion of the blade 110 shown in FIG. 2A, taken at a location where the internal structure of the blade 110 is a truss structure 140. Accordingly, the truss structure 140 can include multiple spars 170 (four are shown in FIG. 2B) attached to spaced-apart ribs 142. Truss members 143 can be connected between neighboring spars 170, for example, using techniques described later with reference to FIGS. 5A-5F.

Figure 2C:
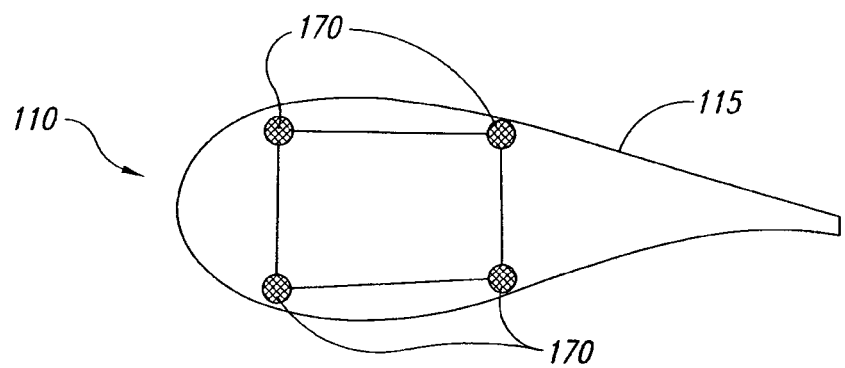
FIGS. 2C-2F are schematic cross-sectional illustrations of wind turbine blade portions having truss structures in accordance with several embodiments of the disclosure.
Figure 2D:
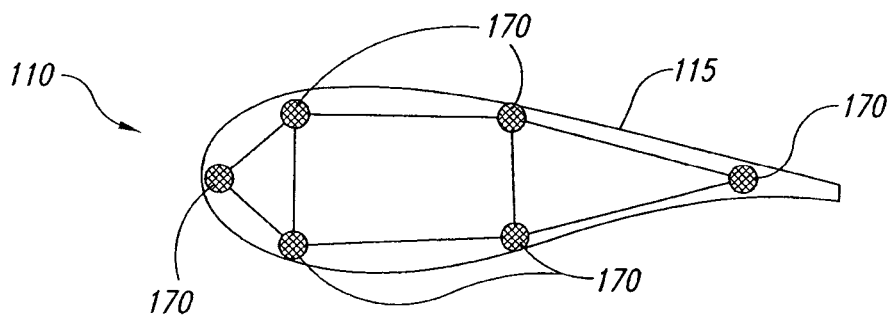
Figure 2E:
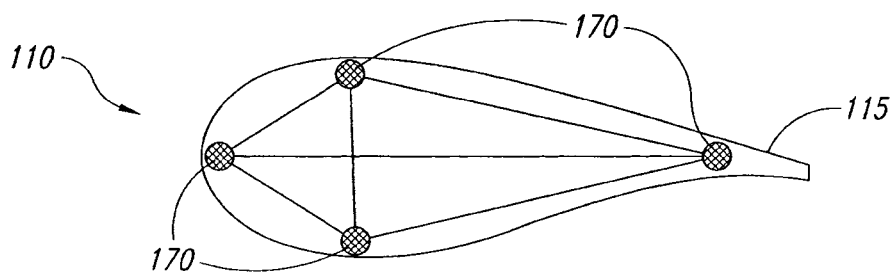
Figure 2F:
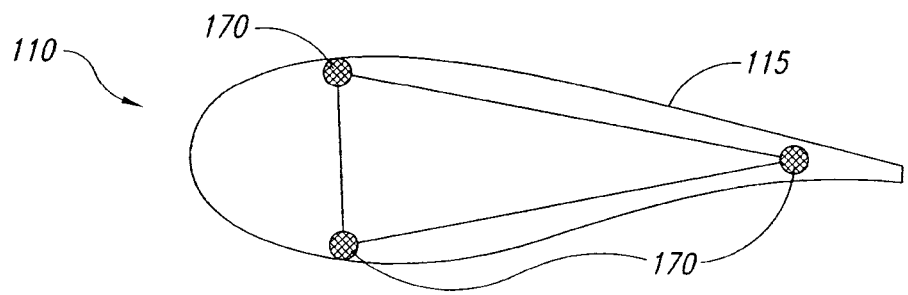

FIGS. 2C-2F are schematic, cross-sectional illustrations of blades 110 having truss arrangements configured in accordance with a variety of embodiments. FIG. 2C illustrates a blade 110 having four spars 170 positioned in a generally rectangular arrangement. FIG. 2D illustrates a blade 110 having six spars 170, including four spars 170 positioned in a generally rectangular arrangement, and two additional spars 170, one positioned forward of the generally rectangular arrangement, and one positioned aft of the generally rectangular arrangement. FIG. 2E illustrates a blade 110 having four spars 170 positioned in a generally diamond-shaped arrangement, and FIG. 2F illustrates a blade 110 having three spars 170 positioned in a triangular arrangement. In other embodiments, the blade 110 can include spars 170 having other arrangements.

Figure 3:
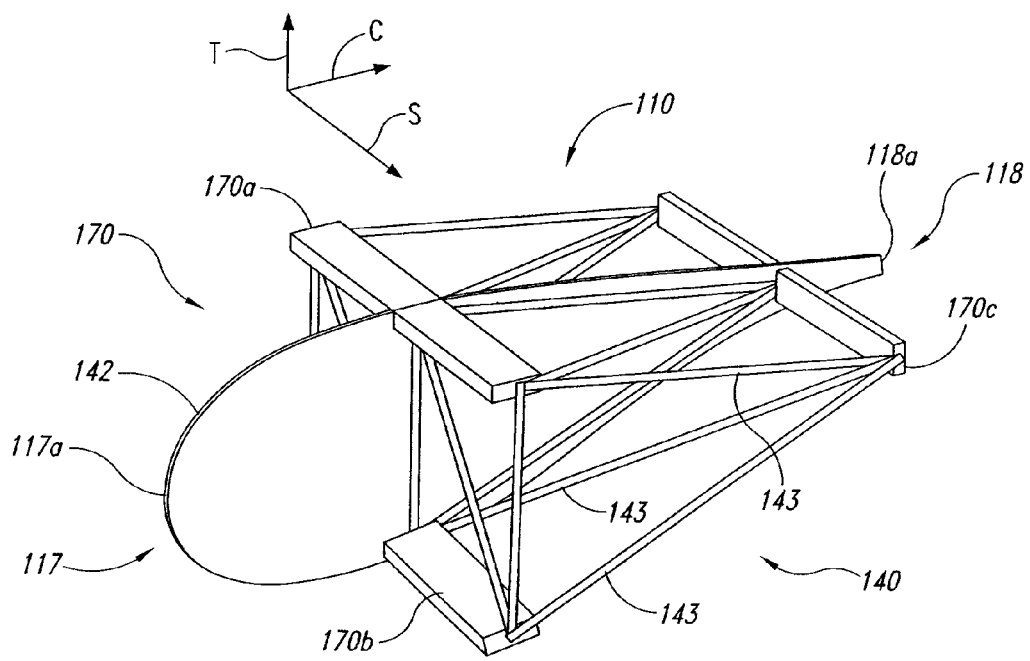
FIG. 3 is a partially schematic, isometric illustration of a portion of a wind turbine blade having three spars that form part of a truss structure in accordance with an embodiment of the disclosure.

FIG. 3 is an isometric illustration of an internal portion of a blade 110 having a truss structure 140 that includes a triangular arrangement of spars 170, generally similar to that shown in FIG. 2F. The blade 110 extends in a longitudinal radial, or spanwise direction along a spanwise axis S, and extends fore and aft along a transverse chordwise axis C. Accordingly, the blade 110 can have a forward leading edge region 117 with a leading edge 117a and an aft trailing edge region 118 with a trailing edge 118a. The thickness of the blade 110 can be measured relative to a thickness axis T transverse to both the spanwise axis S and the chordwise axis C.

In a particular embodiment shown in FIG. 3, the blade 110 can include three spars 170, including a first spar 170a and a second spar 170b, both positioned at the leading edge region 117 and/or toward the leading edge 117a and spaced apart from each other along the thickness axis T. The blade 110 can further include a third spar 170c positioned at the trailing edge region 118 and/or toward the trailing edge 118a and spaced apart from both the first spar 170a and the second spar 170b along the chordwise axis C. Each of the spars 170a-170c is attached to a plurality of ribs 142 (one of which is visible in FIG. 3) which are in turn spaced apart from each other along the spanwise axis S. Each of the spars 170a-c can have a generally rectangular cross-section. The forward spars 170a, 170 can have a chordwise dimension greater than a thickness dimension, and the aft spar 170c can have a thickness dimension greater than a chordwise dimension. The third spar 170c can extend over a majority of the thickness dimension of the blade 110 and in a particular embodiment, can extend over the entirety or nearly the entirety of the thickness dimension. For example, the third spar 170c can have a dimension in the thickness direction that is about the same as the dimension of the rib 142 in the thickness direction.

One feature of the arrangement shown in FIG. 3 is that it can include a single spar (the third spar 170c) at the trailing edge region 118. For example, the truss structure 140 can include only three longitudinally extending spars 170 at any given longitudinal location, with only one of the spars 170 at the trailing edge region 118. This arrangement can allow the third spar 170c to be positioned a greater chordwise distance away from the first and second spars 170a, 170b than some arrangements that include four spars (e.g., the arrangement shown in FIGS. 2B-2C). By spacing the third spar 170c further away from the first and second spars 170a, 170b, the ability of the truss structure 140 to handle large loads in the chordwise direction C is enhanced. This can be particularly important for wind turbine blades mounted to a horizontal shaft because such blades are subjected to significant gravity loads in the chordwise direction C when the blades are at the 3:00 and 9:00 positions described above with reference to FIG. 1. Accordingly, it is expected that this arrangement may be lighter and/or better able to withstand significant loads in the chordwise direction C than at least some arrangements having four spars. At the same time, it is expected that this arrangement will be simpler, lighter and/or less costly than arrangements that include more than four spars e.g., the arrangement described above with reference to FIG. 2D.

The internal structural components described above can be manufactured from suitable composite and/or non-composite materials. For example, the spars 170 can be formed from a laminate of layers that each include unidirectional fiberglass, carbon fibers, and/or other fibers in a matrix of suitable thermoset and/or thermoplastic resins. The fibers can be oriented generally parallel to the spanwise axis S over most of the length of the blade 110, and can have other orientations at specific locations, as described further below with reference to FIGS. 6A-7A. In other embodiments, composite spars can also be fabricated by infusion, prepreg, pultrusion, or press molding. In still further embodiments, the spars 170 can be formed from metallic materials, including machined, forged or cast alloys, metallic laminates, sandwich structures, as well as metal/composite hybrids (e.g., composite facesheets with metallic core, e.g., honeycomb core), etc. The truss members 143 can be formed from aluminum (e.g., 2024-T6 aluminum) or another suitable metal, composite, or other material. The ribs 142 can be formed from a composite of fiberglass and foam or balsa, e.g., a balsa core sandwiched between fiberglass faceplates. In other embodiments, the ribs 142 can be formed from fiberglass alone, without a foam or balsa core, or the ribs 142 can be formed with other techniques and/or components. For example, the ribs 142 can have a corrugated or beaded construction. The ribs 142 can be formed from a single panel, or two spaced apart panels, with no core structure between the two panels. The ribs 142 can also be made from metal; from composite materials such as fiberglass, carbon fibers, and/or other fibers in a matrix of thermoset and/or thermoplastic; and/or from (unreinforced) plastic materials (e.g., resin without fibers). For example, composite ribs can be fabricated by wet lamination, infusion, prepreg, sprayed chopped fiber, press molding, vacuum forming, and/or other suitable mass production techniques.

Figure 4:
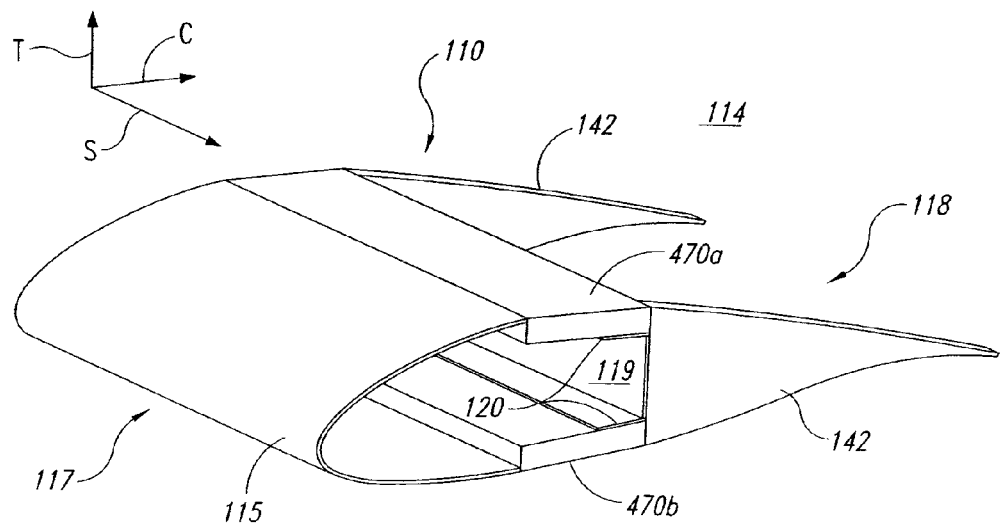
FIG. 4 is a partially schematic, isometric illustration of a portion of a wind turbine blade having a non-truss internal structure in accordance with an embodiment of the disclosure.

FIG. 4 is a partially schematic illustration of a portion of the wind turbine blade 110 located at the outer region 114 described above with reference to FIG. 2A. In this embodiment, the internal structure of the wind turbine blade 110 at the outer region 114 is not a truss structure. For example, the structure can instead include a relatively thin web 119 oriented generally parallel to the thickness axis T and extending along the spanwise axis S. The web 119 can be connected to or formed integrally with flanges 120 extending in the chordwise direction C. Spanwise-extending spars 470a, 470b are attached to each of the flanges 120 and are in turn connected to a skin 115, a portion of which is shown in FIG. 4A. In one embodiment, the structure can include spaced-apart ribs 142 positioned in the trailing edge region 118. In other embodiments, such ribs 142 can extend into the leading edge region 117 as well. The skin 115 can be formed from a fiberglass-balsa-fiberglass sandwich, or a fiberglass-foam-fiberglass sandwich. In other embodiments, the skin 115 can be formed from composite materials fabricated by wet lamination, infusion, prepreg, sprayed chopped fiber, press molding, vacuum forming, and/or other mass production techniques. The skin 115 can have the same construction in both the outer region 114 shown in FIG. 4, and the inner region 113 shown in FIG. 3. The ribs 142 can have a similar construction. The web 119 and flanges 120 can be formed from fiberglass, e.g., unidirectional fiberglass. In other embodiments, any of the foregoing components can be formed from other suitable materials. The spars 470a, 470b located in the outer region 114 can be bonded to corresponding spars at the inner region 113 (FIG. 2A) using a variety of techniques including, but not limited to, those described later with reference to FIGS. 6A-6C and 8A-16. In any of these embodiments, the spars 470a, 470b located in the outer region 114 can extend along the same generally smooth, continuous longitudinal axes as the counterpart spars in the inner region 113 to efficiently transfer loads from the outer region 114 to the inner region 113.

One feature of the arrangement described above with reference to FIGS. 2A-4 is that the blade 110 can include both truss and non-truss internal structures. An advantage of this arrangement is that it can be more structurally efficient than a design that includes either a truss structure alone or a non-truss structure alone. For example, the truss structure can be used at the inner region 113 (e.g., near the hub) where bending loads are higher than they are near the tip 111, and where the blade 110 is relatively thick. At the outer region 114, the non-truss structure can be easier to integrate into this relatively thin portion of the blade 110. The non-truss structure in this region is also expected to be more structurally efficient than a truss structure, which tends to lose efficiency when the aspect ratio of the closed shapes formed by the truss members becomes large.

Figure 5A:
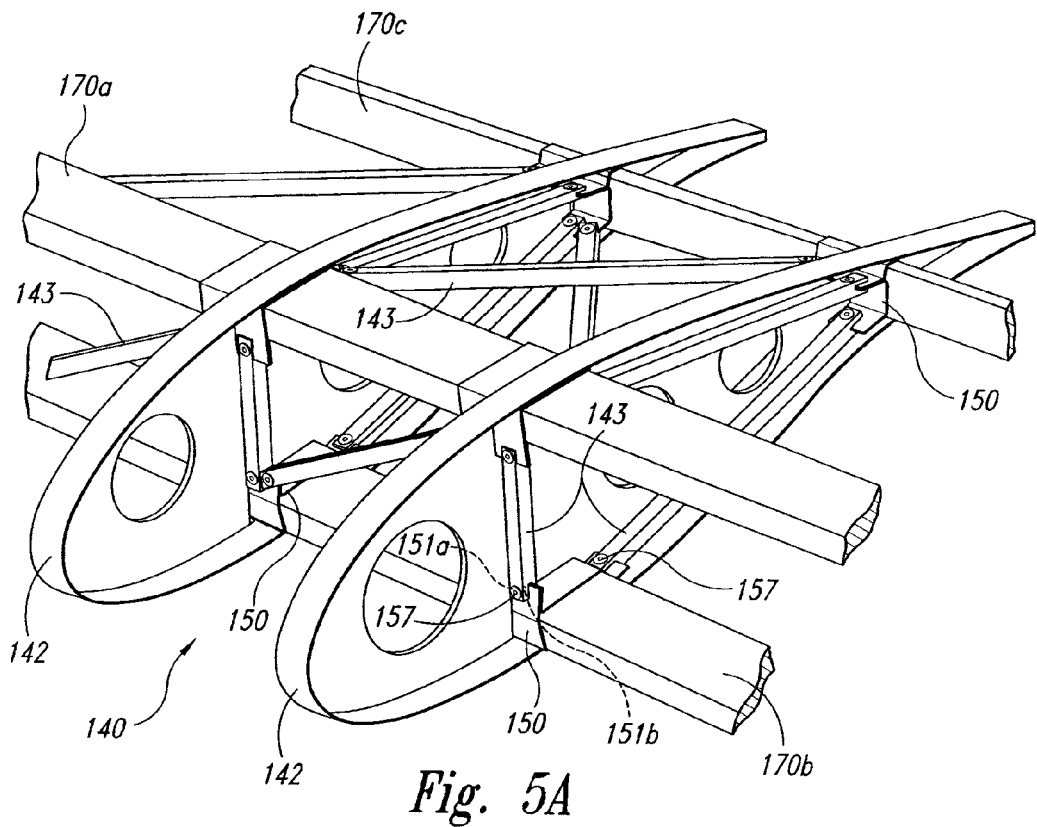
FIG. 5A is a partially schematic, isometric illustration of an internal portion of a wind turbine blade having truss attachment members configured in accordance with an embodiment of the disclosure.

FIG. 5A is a partially schematic, isometric illustration of a portion of a representative truss structure 140 configured in accordance with a particular embodiment of the disclosure. In this embodiment, the truss structure 140 includes three spars 170, identified as a first spar 170a, a second spar 170b and a third spar 170c. In other embodiments, the truss structure 140 can have other numbers and/or arrangements of spars 170. In any of these embodiments, the truss structure 140 can include truss members 143 and ribs 142, in addition to the spars 170. Truss attachment members 150 can connect the truss members 143 to the spars 170. For example, truss members 143 can include a first attachment feature 151a (e.g., a first mounting hole) that is aligned with a second attachment feature 151b (e.g., a second corresponding mounting hole) carried by the truss attachment member 150. When the two attachment features 151a, 151b include corresponding holes, they can be connected via an additional fastening member 157, e.g., a rivet or threaded fastener. In other embodiments, the attachment features 151a, 151b can be connected directly to each other, for example, if one feature includes an expanding prong and the other includes a corresponding hole.

Figure 5B:
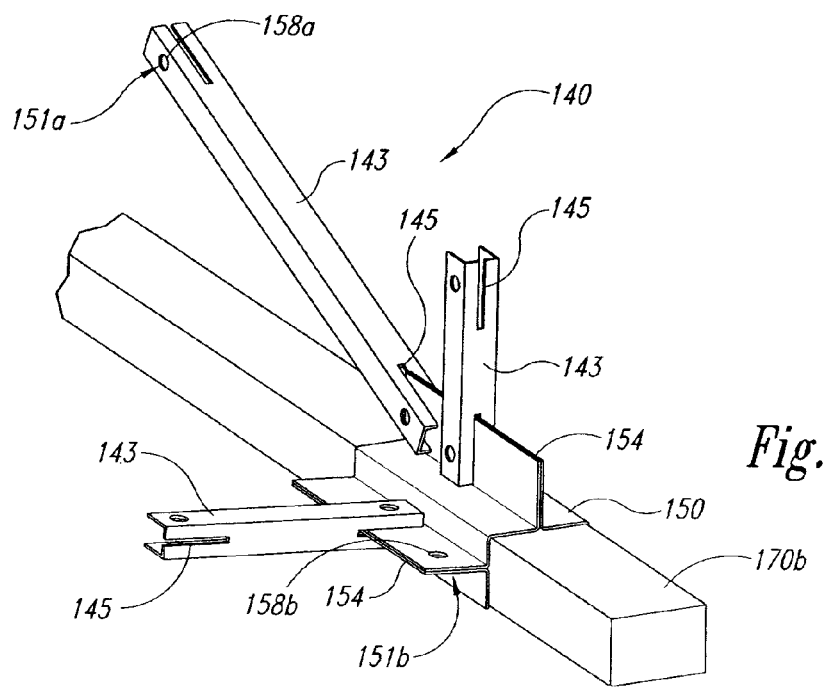
FIGS. 5B-5C are enlarged isometric illustrations of a truss attachment member configured in accordance with an embodiment of the disclosure.

FIG. 5B illustrates a representative portion of the truss structure 140 described above with reference to FIG. 5A. As shown in FIG. 5B, a representative truss attachment member 150 is positioned along the second spar 170b so as to receive and attach to multiple truss members 143. Each of the truss members 143 can include a slot 145 which receives a flange-shaped truss attachment portion 154 of the truss attachment member 150. In this embodiment, the attachment features 151a, 151b include corresponding holes 158a, 158b that are connected with the fastening members 157 described above with reference to FIG. 5A.

Figure 5C:
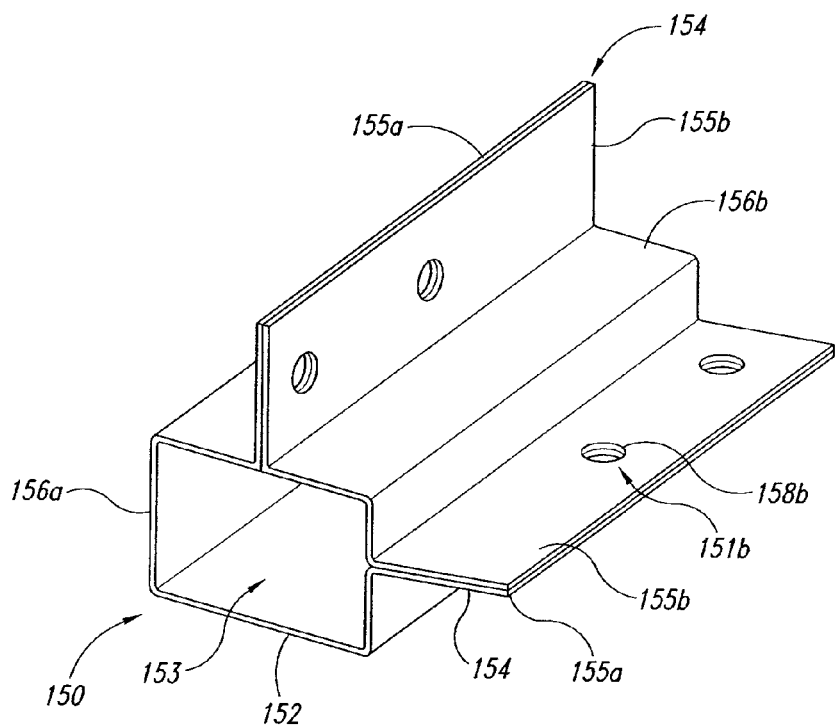

FIG. 5C is an enlarged isometric illustration of one of the truss attachment members 150 shown in FIGS. 5A-5B. In this embodiment, the truss attachment member 150 includes a spar attachment portion 152 (e.g. having a channel 153 in which the corresponding spar 170 is positioned), and one or more truss attachment portions 154 (two are shown in FIG. 5B). The truss attachment portions 154 can have a flat, flange-type shape in which the second attachment features 151b (e.g., the mounting holes 158b) are positioned. In a particular embodiment shown in FIG. 5B, the truss attachment member 150 is formed from two complementary components or pieces: a first component or piece 156a and second component or piece 156b. The first piece 156a includes two first flange portions 155a, and the second piece 156b includes two second flange portions 155b. When the two pieces 156a, 156b are placed together, the first flange portions 155a mate with corresponding second flange portions 155b to form two flange pairs, each of which forms one of the truss attachment portions 154. Accordingly, each first flange portion 155a can be in surface-to-surface contact with the corresponding second flange portion. The first and second portions 155a, 155b can have aligned mounting holes configured to receive a corresponding fastener. The two pieces 156a, 156b also form the channel 153. In a particular aspect of this embodiment, the first piece 156a and the second piece 156b are sized so that, when placed together, the resulting channel 153 is slightly smaller than the cross section of the spar around which it is placed. Accordingly, when the two pieces 156a, 156b are forced toward each other, the truss attachment member 150 can be clamped around the corresponding spar, thus securing the truss attachment member 150 in position. For example, when second attachment feature 151b includes a mounting hole, the manufacturer can pass a fastener 157 through the mounting hole to both attach the truss attachment member 150 to the corresponding truss member 143 (FIG. 5A), and also clamp the truss attachment member 150 around the corresponding spar 170 (FIG. 5A).

In other embodiments, the truss attachment members 150 can be formed using other techniques. For example, the truss attachment members 150 can be extruded, molded, cast, or machined. In any of these embodiments, the truss attachment member 150 can be formed from a light-weight material, e.g. a metal such as aluminum or steel, or a suitable composite. In other embodiments, the truss attachment members 150 can be formed from other materials that readily accommodate the attachment features 151b. The truss attachment members 150 can be secured to the corresponding spars using the clamping technique described above, and/or other techniques, including but not limited to adhesive bonding or co-curing.

The truss attachment members 150 can have other shapes and/or configurations in other embodiments. For example, the spar attachment portion 152 need not extend around the entire circumference of the corresponding spar 170, but can instead extend around only a portion of the spar 170. In some embodiments for which an adhesive joint between the truss attachment member 150 and the spar 170 provides sufficient strength, the truss attachment member 150 can have only a relatively small surface contacting the spar 170. The truss attachment member can include other numbers of truss attachment portions 154, e.g., only one truss attachment portion 154, or more than two truss attachment portions 154.

In still further embodiments, the truss attachment members 150 can be formed from other materials. For example, the truss attachment members 150 can be formed from a composite material. In a particular example, the truss attachment member 150 is formed by wrapping strands (e.g., plies of strands) around the spar 170, and overlapping the ends of the strands (or plies) to form one or more flanges. The strands are attached to the spar 170 with an adhesive, and/or via a co-curing process. The corresponding truss member 143 attached to the truss attachment member 150 can have a slot 145 that receives the flange and is secured to the flange with an adhesive.

One feature of an embodiment of the truss attachment member 150 described above with reference to FIGS. 5A-5C is that it does not require holes in the spar 170 to provide an attachment between the spar 170 and the corresponding truss members 143. Instead, the truss attachment member 150 can be clamped or otherwise secured to the spar 170 and the holes can be located in the truss attachment member 150 rather than in the spar 170. This arrangement can be particularly beneficial when the spar 170 includes composite materials, as it is typically more difficult to form mounting holes in such materials, and/or such holes may be more likely to initiate propagating fractures and/or create stress concentrations in the spar 170.

Figure 5D:
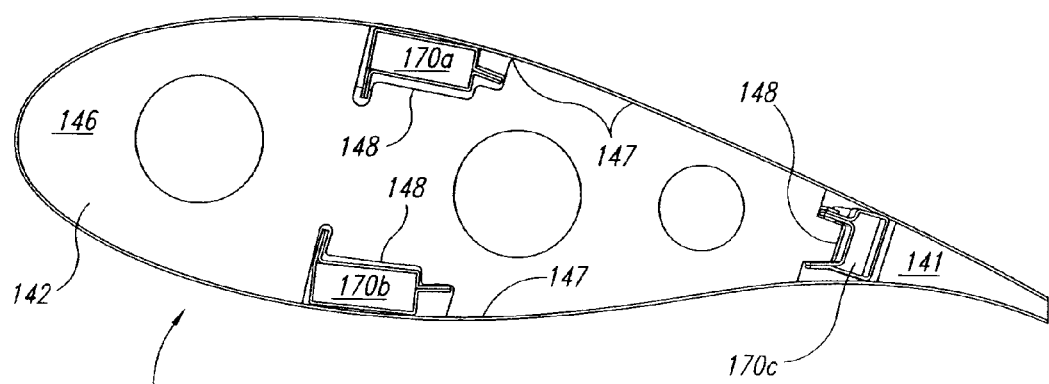
FIGS. 5D-5F illustrate several views of an internal portion of a wind turbine blade having a truss structure secured at least in part with truss attachment members configured in accordance embodiments of the disclosure.
Figure 5E:
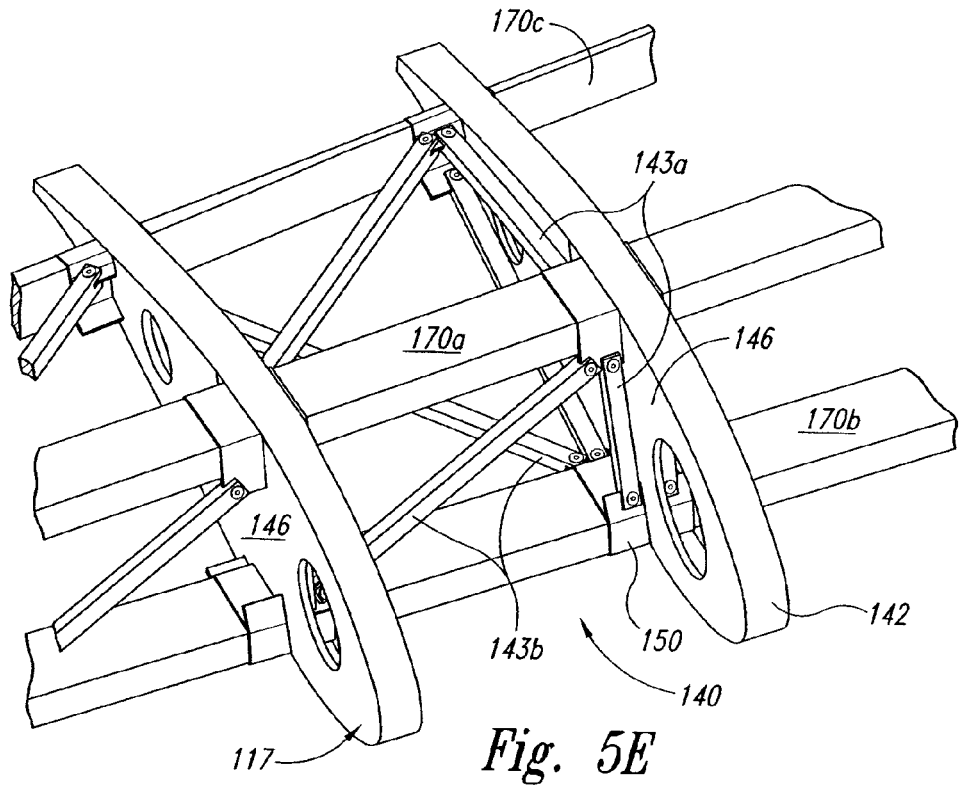
Figure 5F:
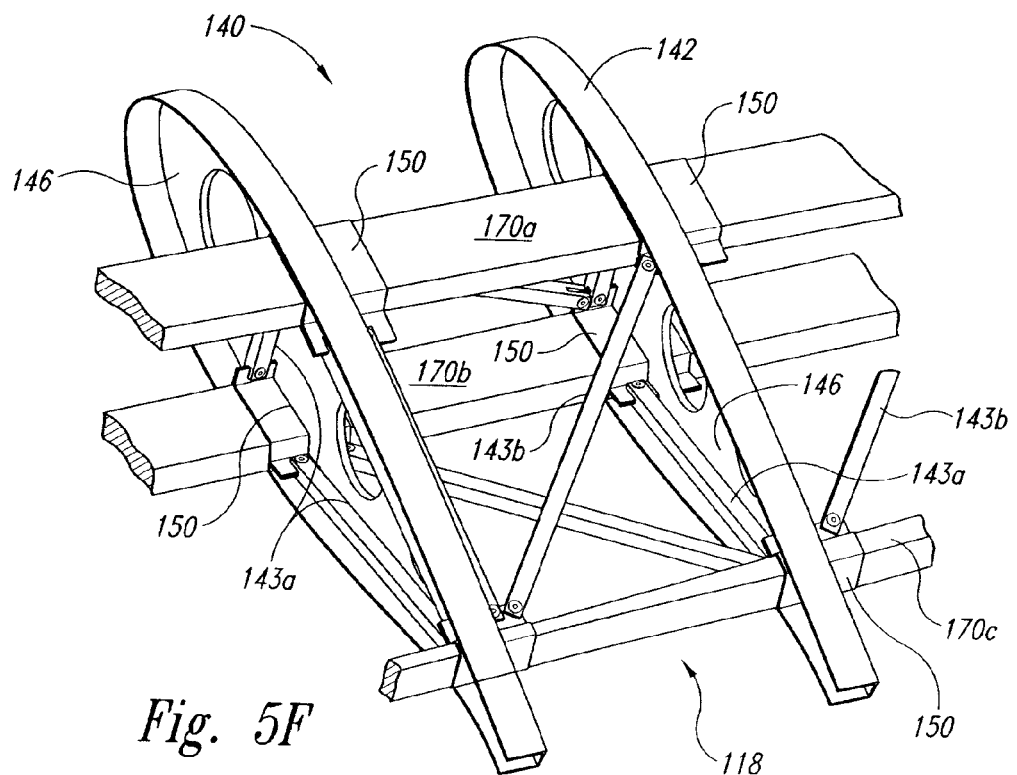

FIGS. 5D-5F illustrate other views of the truss structure 140 described above with reference to FIG. 5A. FIG. 5D is a side view of a portion of the truss structure 140, illustrating a representative rib 142. The rib 142 includes a web 146 and a flange 147 extending around the web 146. The web 146 can include one or more cut-outs 148 (three are shown in FIG. 5D) that accommodate the corresponding spars 170a-170c. In a particular embodiment shown in FIG. 5D, the cut-out 148 accommodating the third spar 170c can extend entirely through the thickness of the rib 142. As a result, a trailing edge portion 141 of the rib 142 is discontinuous from the rest of the web 146 of rib 142. Accordingly, the flange 147 of the rib 142 can secure the trailing edge portion 141 of the rib 142 to the rest of the rib 142.

FIG. 5E is a view of the truss structure 140 from a position forward of and above the leading edge region 117, and FIG. 5F is a view of the truss structure 140 from a position above the trailing edge region 118. As is shown in both FIGS. 5E and 5F, the truss members can include first truss members 143a and second truss members 143b. The first truss members 143a can be positioned adjacent to the web 146 of a corresponding rib 142, and can be joined to the web 146, in particular, via an adhesive or other bonding technique. Accordingly, the first truss members 143a in combination with the truss attachment members 150 can secure the ribs 142 to the spars 170a-170c. The second truss members 143b can extend transversely (e.g., diagonally) between neighboring ribs 142 and/or spars 170 to increase the overall strength and stiffness of the truss structure 140.

FIG. 6A is a partially schematic, side elevation view of a joint between two portions 171 of a spar 170. The two portions can include a first portion 171a and a second portion 171b, and the joint can be formed along a non-monotonically varying (e.g., zig-zagging) bond line 176. Such a bond line 176 is expected to produce a stronger bond between the first and second portions 171a, 171b than is a straight or diagonal bond line. The first and second portions 171a, 171b may each form part of a different neighboring segment of the overall spar 170, as described above with reference to FIG. 2A. For example, the first portion 171a can be part of the first segment 116a shown in FIG. 2A, and the second portion 171b can be part of the second segment 116b.

The first portion 171a can include multiple, stacked, laminated first layers 172a, and the second portion 171b can include multiple, stacked, laminated second layers 172b. In a particular embodiment, the layers 172a, 172b can be formed from a unidirectional fiber material (e.g., fiberglass or a carbon fiber) and a corresponding resin. Each of the layers 172a, 172b can be formed from a single ply or multiple plies (e.g., six plies). The layers 172a, 172b can be prepreg layers, hand lay-ups, pultrusions, or can be formed using other techniques, e.g., vacuum-assisted transfer molding techniques. The first layers 172a terminate at first terminations 173a, and the second layers 172b terminate at second terminations 173b. Neighboring terminations 173a, 173b located at different positions along the thickness axis T can be staggered relative to each other to create the zig-zag bond line 176. This arrangement produces projections 174 and corresponding recesses 175 into which the projections 174 fit. In a particular aspect of this embodiment, each layer has a termination that is staggered relative to its neighbor, except where the bond line 176 changes direction. At such points, two adjacent layers can be terminated at the same location and bonded to each other, to prevent a single layer from being subjected to increased stress levels.

During a representative manufacturing process, each of the first layers 172a are stacked, bonded and cured, as are each of the second layers 172b, while the two portions 171a, 171b are positioned apart from each other. The layers 172, 172b are pre-cut before stacking so that when stacked, they form the recesses 175 and projections 174. After the two portions 171a, 171b have been cured, the recesses 175 and/or projections 174 can be coated and/or filled with an adhesive. The two portions 171a, 171b are then brought toward each other so that projections 174 of each portion are received in corresponding recesses 175 of the other. The joint region can then be bonded and cured.

FIG. 6B is an illustration of a spar 170 having a bond line 176 generally similar to that described above with reference to FIG. 6A. As is also shown in FIG. 6B, the spar 170 can include one or more clamps or straps 177 that are positioned at or near the bond line 176. The clamps 177 can be positioned to prevent or halt delamination that might result between any of the layers in the composite spar 170. For example, as shown in FIG. 6C, if a potential delamination 178 begins between two layers 172a, the compressive force provided by the clamp 177 can prevent the delamination 178 from spreading further in a spanwise direction. The clamp 177 can be positioned where it is expected that the potential risk of delamination is high, e.g., at or near the termination 173 of the outermost layers 172a, 172b shown in FIG. 6B. In other embodiments, the function provided by the clamps 177 can be provided by other structures. For example, the truss attachment members 150 described above can perform this function, in addition to providing attachment sites for the truss members.

FIGS. 6D-6G are a series of partially schematic, side elevation views of spars 670a-670d, respectively, illustrating various joints that can be formed between adjacent spar portions 671 in accordance with other embodiments of the disclosure. The spars 670 can be at least generally similar in structure and function to the spar 170 described in detail above. For example, as shown in FIG. 6D, the spar 670a can include a first portion 671a having multiple, stacked, laminated first layers 672a, and a second portion 671b having multiple, stacked, laminated second layers 672b. In addition, the first portion 671a can be joined to the second portion 671b along a bond line 676a that is non-monotonically varying (e.g., zigzagging) along the thickness axis T. In this particular embodiment, however, the first layers 672a and the second layers 672b have first terminations 673a and second terminations 673b, respectively, that are not parallel to the chordwise axis C. That is, the terminations 673 are beveled or slanted relative to the chordwise axis C. The bevels can have the same direction and extent for each layer, or these characteristics can vary from one layer to the next. For example, as shown in FIGS. 6D and 6E in dashed lines, the layer below the topmost layer can be beveled in the opposite direction as the topmost layer. Bevels in neighboring layers can be positioned directly above and below each other, as shown in FIGS. 6D and 6E, or the bevels in neighboring layers can be offset in a spanwise direction so as not to overlay each other.

Referring next to FIG. 6E, the spar 670b can be at least generally similar in structure and function to the spar 670a described in detail above. For example, the spar 670b can include a first portion 671c having multiple, stacked, laminated first layers 672a, and a second portion 671d having multiple, stacked, laminated second layers 672b. In this particular embodiment, however, the first layers 672a have first terminations 673c that form a projection 674a, and the second layers 672b have second terminations 673d that form a recess 675a. The projection 674a is received in the recess 675a to form a bond line 676b that is non-monotonically varying along both the thickness axis T and the chordwise axis C.

Referring next to FIG. 6F, the spar 670c is at least generally similar in structure and function to the spar 670a described in detail above. In this particular embodiment, however, the first layers 672a include first terminations 673e, and the second layers 672b include second terminations 673f, that form alternating projections 674b and recesses 675b along the chordwise axis C. This results in a bond line 676c that is non-monotonically varying along the chordwise axis C but not along the thickness axis T.

Referring next to FIG. 6G, in this particular embodiment the first layers 672a include first terminations 673g, and the second layers 672b include terminations 673h, that form alternating projections 674c and recesses 675c along the chordwise axis C, and alternating projections 674d and recesses 675d along the thickness axis T. As the foregoing discussion illustrates, there are a wide variety of non-monotonically varying, staggered, zigzagging, overlapping, and/or other bond lines that can be used to efficiently and strongly join spar portions together in accordance with the present disclosure. Accordingly, the present disclosure is not limited to bond lines having any particular configuration.

One feature of embodiments described above with reference to FIGS. 6A-6G is that they can include spar portions connected to each other along a bond line that has a zig-zag shape, or otherwise varies in a non-monotonic manner. An expected advantage of this arrangement is that the bond line will be stronger than a simple vertical or diagonal bond line. In addition, it is expected that forming the bond line can be simplified because it does not require the use of a significant number of additional fastening elements, and can instead employ a bonding technique generally similar to the technique used to bond the individual layers of the two portions. Still further, the bond between the spar portions may be formed with no heating, or only local heating, which avoids the need to heat the entire blade. The foregoing characteristics can in turn facilitate the ease with which a manufacturer and/or installer forms a large wind turbine blade that is initially in multiple segments (e.g., the segments 116 described above with reference to FIG. 2A), which are then joined to each other, for example, at an installation site. Further details of suitable manufacturing techniques' are described later with reference to FIGS. 8A-16.

In other embodiments, the spar 170 can include other configurations and/or materials. For example, selected plies can be formed from metal or carbon fiber rather than glass fiber. The plies need not all have the same thickness. Accordingly, the dimensions and materials selected for each ply can be selected to produce a desired strength, stiffness, fatigue resistance and cost.

Figure 7A:
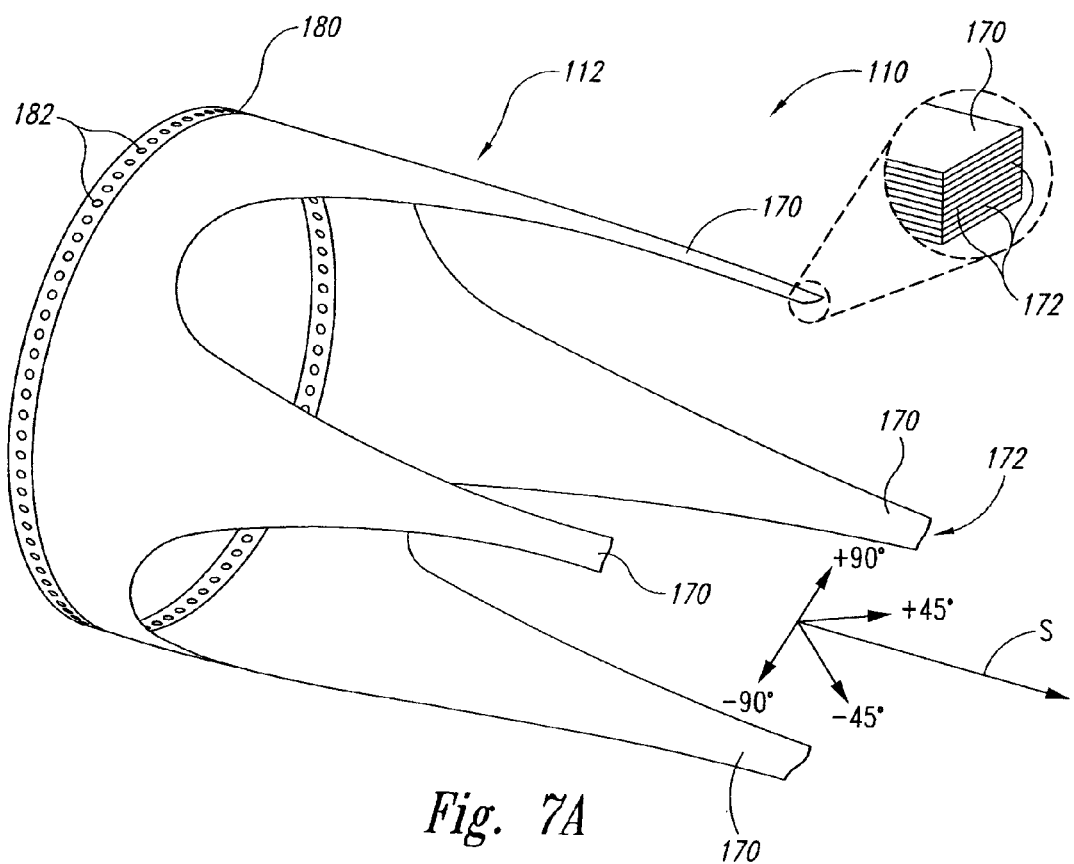
FIG. 7A is a partially schematic, isometric illustration of a spar having layers, that fan out at a hub attachment region in accordance with an embodiment of the disclosure.

FIG. 7A is a partially schematic illustration of a hub attachment portion 112 configured in accordance with an embodiment of the disclosure. For purposes of illustration, FIG. 7A illustrates only the hub attachment portion 112, and in particular, the transition between the longitudinally extending spars 170 and a hub attachment element, e.g., a circumferentially extending hub attachment ring 180. The ring 180 can include a non-composite structure, e.g., a metallic element, and can have a relatively short spanwise direction as shown in FIG. 7A, or a longer spanwise dimension in other embodiments. The ring 180 or the hub attachment portion 112 can be circumferentially continuous, or formed from multiple sections arranged circumferentially. For example, the hub attachment portion 112 can include one circumferential section for each spar 170, with each section connected to a continuous ring 180. Other hub attachment elements that may be included in the hub attachment region 112 are not shown in FIG. 7A. The hub attachment portion 112 can include a transition to four spars 170 (as shown in FIG. 7A) or other numbers of spars 170 (e.g., three spars 170, as shown in FIG. 3).

Each of the spars 170 can include a laminate composite of layers 172, and each of the layers 172 can in turn include multiple plies. For example, in a particular embodiment, each of the spars 170 can include a laminate of fifteen layers 172, each having a total of six plies, for a total of ninety plies. Each of the plies can have fibers that are oriented unidirectionally, for example, in alignment with the spar axis S. Accordingly, such fibers have a 0° deviation from the spar axis S. The layers 172 can be stacked one upon the other, each with fibers oriented at 0° relative to the spar axis S, and can be cut so as to have the shape shown in FIG. 7A. The number of plies oriented at 0° relative to the spar axis S can be reduced in a direction extending toward the ring 180. For example, the number, of such plies can be reduced from ninety at the right side of FIG. 7A (where the spars 170 have a generally fixed, rectangular cross-sectional shape) to twenty at the ring 180 on the left side of FIG. 7A (where the structure has thinner, arcuate shape). The seventy deleted layers 172 can be terminated in a staggered fashion so that the overall thickness of the structure is gradually reduced from right to left As the 0° orientation layers 172 are dropped off, the manufacturer can add layers that are oriented at other angles relative to the spar axis S. For example, the manufacturer can add layers having fibers oriented at +45° and −45° relative to the spar axis S. In a particular embodiment, twenty to thirty such plies can be added, so that the total number of plies at the ring 180 is between forty and fifty, as compared with ninety plies at the right side of FIG. 7A. By adding the +45°/−45° oriented plies to the structure at the hub attachment portion 112, the load carried by the spars 170 can be spread out in a circumferential direction and distributed in a more uniform fashion at the ring 180. To further enhance this effect, the load path can be "steered" by providing a different number of +45° plies as compared with −45° plies. This arrangement can accordingly reduce or eliminate the likelihood that individual bolts passing through bolt holes 182 in the ring 180 will experience significantly higher loads than other bolts located at different circumferential positions. As a result, this arrangement is expected to not only provide a smooth transition from the airfoil-shaped cross section of the blade 110 to the circular cross-section shape at the hub attachment portion 112, but is also expected to more evenly distribute the loads than do existing structures.

Figure 7B:
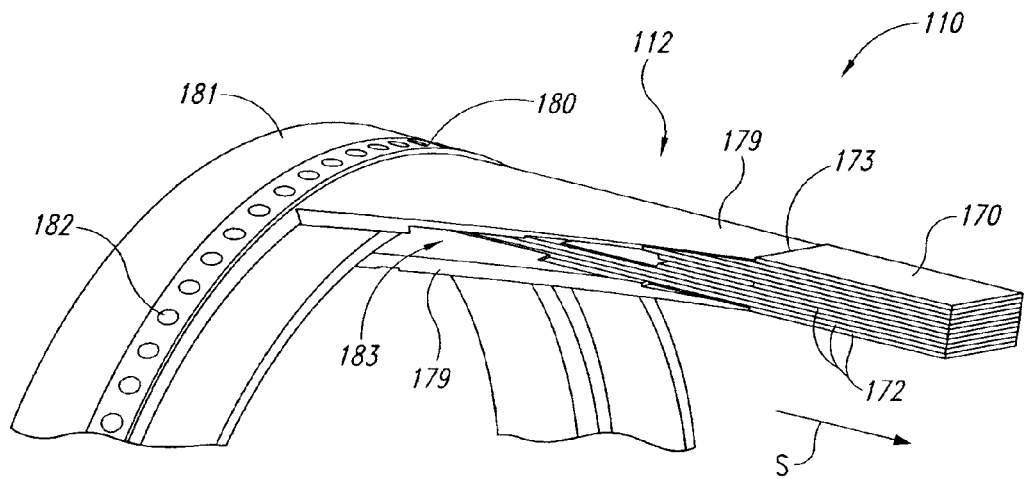
FIG. 7B is a partially schematic, isometric illustration of a spar connected to fan-shaped transition plates at a hub attachment region in accordance with another embodiment of the disclosure.

FIG. 7B is another illustration of a hub attachment portion 112 in which the spar 170 includes layers 172 of unidirectionally extending fibers, aligned with the spar axis S. In this embodiment, individual layers 172 terminate at terminations 173. One or more termination elements 179 (e.g., plates), each having a curved, fan-type shape, can be butted up against the spar 170, and can include recesses that receive the terminated layers 172. In a particular embodiment shown in FIG. 7B, this arrangement includes three transition elements 179, two of which are visible in FIG. 7B. The two visible transition elements 179 each accommodate multiple layers 172 (e.g., four or more layers 172). A gap 183 between the two transition elements 179 receives a third transition element (not shown in FIG. 7B for purposes of clarity) that in turn receives the remaining layers 172. Each of the transition elements 179 can then be attached to the ring 180, which is in turn connected to a pitch bearing 181. The pitch bearing 181 is used to vary the pitch of the wind turbine blade 110 in use. Each of the transition elements 179 can have a generally arcuate cross-sectional shape where it connects to the ring 180, and a generally flat, rectangular or rectilinear cross-sectional shape at its furthest point from the ring 180, where it connects to the spar 170.

In other embodiments, the transition region between the hub attachment ring 180 or other attachment feature, and the rest of the blade 110 can have other arrangements. For example, the general arrangement of fan-shaped plies or plies in combination with transition elements can be applied to other blade structures that may not include the spars described above. In another example, the arrangement of +45°/−45° plies described above can be used to "steer" loads (e.g., to more evenly distribute loading at the boltholes 182) in blades 110 that do not include the spars 170, or in blades 110 that include spars or other structures arranged differently than is described above.

FIG. 8A is a partially schematic, side elevation view of a manufacturing assembly 801 of the turbine blade 110 configured in accordance with an embodiment of the disclosure, and FIG. 8B is an enlarged end view taken along line 8B-8B in FIG. 8A illustrating a representative rib 142 supported by a tool stanchion 802. Referring to FIGS. 8A and 8B together, the manufacturing assembly 801 includes a plurality of ribs 142 supported by individual tool stanchions 802 at the appropriate spanwise locations. As discussed above, the turbine blade 110 includes an inboard or first blade segment 116a, a midboard or second blade segment 116b, and an outboard or third blade segment 116c. In the illustrated embodiment, the second spar 170b (e.g., the lower or "pressure" spar) has been assembled onto the ribs 142. The spar 170b includes an inboard or first spar portion 871a, a midboard or second spar portion 871b, and an outboard or third spar portion 871c.

Referring next to FIG. 8B, as explained above with reference to FIG. 5D, the ribs 142 include a plurality of cutouts 148 configured to receive corresponding truss attachment members 150. More particularly, in the illustrated embodiment the representative rib 142 includes a first cutout 148a configured to receive the first spar 170a (e.g., the suction spar; not shown in FIG. 8A or 8B), a second cutout 148b configured to receive the second spar 170b (e.g., the pressure spar), and a third cutout 148c configured to receive the third spar 170c (e.g., the aft spar; also not shown in FIG. 8A or 8B). As described in greater detail below, in various embodiments one or more of the spars 170 can be manufactured by laminating a plurality of prefabricated composite layers or "pultrusions" together in position on the manufacturing assembly 801. Further details of these embodiments are described in greater detail below with respect to FIG. 9A-16.

Figure 9A:
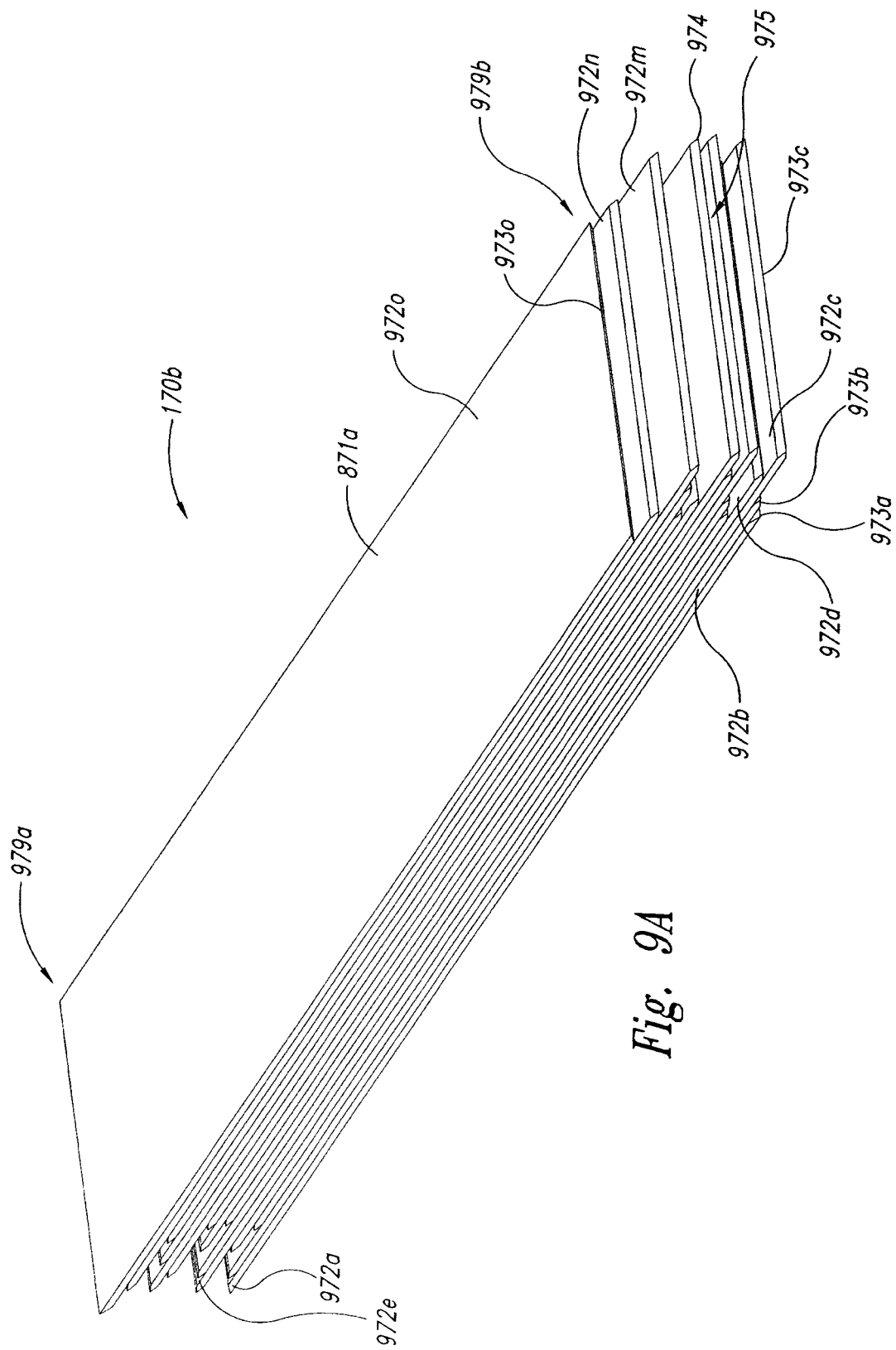

FIGS. 9A-9C are a series of partially schematic, enlarged isometric views of the inboard spar portion 871a, the midboard spar portion 871b, and the outboard spar portion 871c configured in accordance with embodiments of the disclosure. Referring first to FIG. 9A, in the illustrated embodiment the spar 170b can be manufactured from a plurality of layers 972 (identified individually as layers 972a-o) that are bonded or otherwise laminated together in place on the manufacturing assembly 801 (FIG. 8A). In particular embodiments, the layers 972 can include prefabricated composite materials, such as pultrusions or "planks" of pultruded composite materials. As is known, composite pultrusion is a manufacturing process that creates fiber-reinforced polymer or resin products having relatively consistent shape, strength and resilience characteristics. In a typical pultruding process, the reinforcement material (e.g., unidirectional fibers, tows, roving, tape etc. of glass fibers, aramid fibers, carbon fibers, graphite fibers, Kevlar fibers, and/or other material) is drawn through a resin bath (e.g., a liquid thermosetting resin bath of epoxy resin, vinylester resin, polyester resin, plastic). The wet, fibrous element is then pulled through a heated steel die, in which accurate temperature control cures the resin and shapes the material into the desired profile. The pultrusions can then be cut to the desired length for use. Strength, color and other characteristics can be designed into the profile by changes in the resin mixture, reinforcement materials, die profiles, and/or other manufacturing parameters.

In the illustrated embodiment, the layers 972 can be formed from pultruded planks having generally rectangular cross sections. In one embodiment, for example, the layers 972 can have cross-sectional widths of from about 2 inches to about 12 inches, or from about 4 inches to about 10 inches, and cross-sectional thicknesses of from about 0.10 inch to about 0.5 inch, or about 0.25 inch. In other embodiments, the layers 972 can have other shapes and sizes. In particular embodiments, the layers 972 can be provided by Creative Pultrusions, Inc., of 214 Industrial Lane, Alum Bank, Pa. 15521. In other embodiments, the layers 972 can be comprised of other types of pultruded materials as well as other types of composite materials including both prefabricated and hand-laid composite materials. In yet other embodiments, the methods of manufacturing turbine blade spars described herein can be implemented using other types of laminated materials. Such materials can include, for example, wood (e.g., balsa wood, plywood, etc.), metals (e.g., aluminum, titanium, etc.) as well as combinations of wood, metals, composites, etc.

Referring still to FIG. 9A, the inboard spar portion 871a includes an inboard end portion 979a and an outboard end portion 979b. Each of the end portions includes a staggered arrangement of layers 972. For example, with reference to the outboard end portion 979b, each of the layers 972 includes a corresponding termination 973 (identified individually as terminations 973a-o) which is staggered relative to adjacent terminations 973 to form projections 974 and corresponding recesses 975. In addition, in various embodiments the layers 972 can be tapered toward the terminations 973 at the end portions 979. As described in greater detail below, this arrangement of alternating projections 974 and recesses 975 facilitates joining the first spar portion 871a to the second spar portion 871b in a very efficient overlapping joint with a zigzag bond line.

Referring next to FIG. 9B, the second spar portion 871b is also comprised of a plurality of layers 972 having terminations 973 that are staggered to create an alternating arrangement of projections 974 and corresponding recesses 975. Like the first spar portion 871a, the second spar portion 871b includes an inboard end portion 979c and an outboard end portion 979d. As illustrated in FIG. 9B, however, the second spar portion 871b becomes thinner (i.e., it tapers in thickness) toward the outboard end portion 979d. In the illustrated embodiment, this is accomplished by successive termination of the outer layers 972 as they extend outwardly from the inboard end portion 979c. This gradual tapering of the spar 170b can be done to reduce weight and/or tailor the strength of the spar 170b for the reduced structural loads that occur toward the tip of the turbine blade 110.

Referring next to FIG. 9C, the third spar portion 871c includes an inboard end portion 979c and a corresponding outboard end portion 979f. As this view illustrates, the spar 170b continues to taper toward the outboard end portion 979f by terminating various layers 972 as they approach the end portion 979f.

Figure 9D:
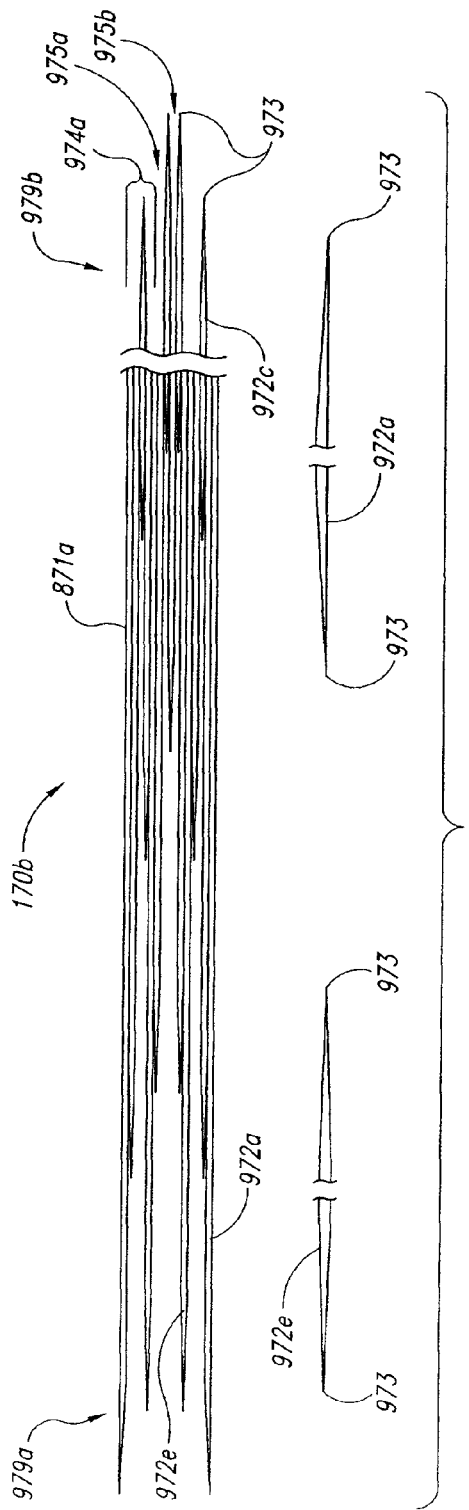
FIGS. 9D and 9E include partially schematic, cut-away side elevation views of the inboard and midboard spar portions of FIGS. 9A and 9B, respectively.
Figure 9E:
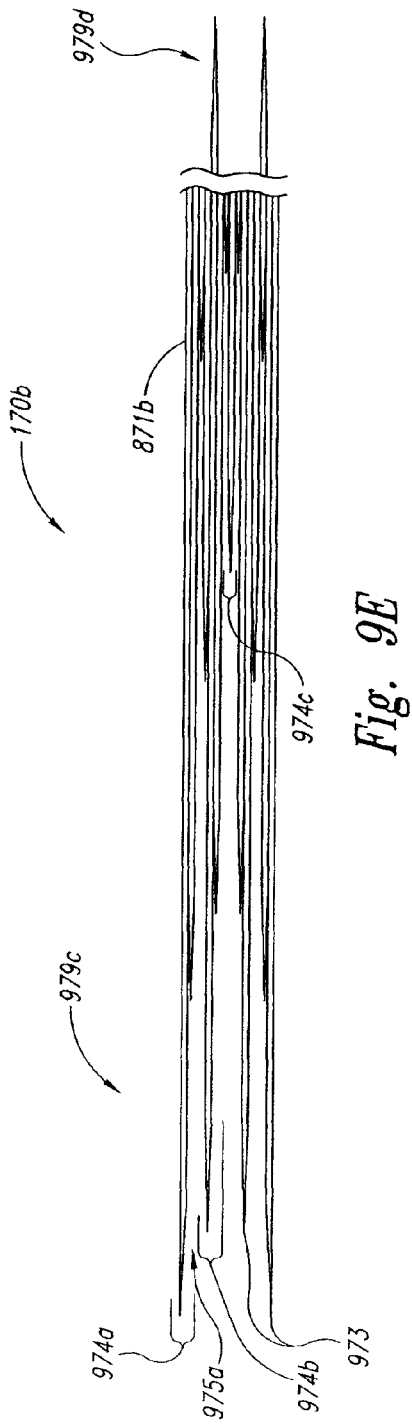

FIGS. 9D and 9E include partially schematic, enlarged side views illustrating additional details of the first spar portion 871a and the second spar portion 871b configured in accordance with an embodiment of the disclosure. In addition, these Figures also illustrate various features of the end portions of some of the layers 972. As shown in FIG. 9D, the outboard end portion 979b of the first spar portion 871a includes a plurality of alternating projections 974 and corresponding recesses 975 formed by the staggered terminations 973 of the respective layers 972. As this view further illustrates, the end portions of the layers 972 can be gradually tapered toward the termination 973 to further facilitate and shape the projections 974/recesses 975 into gradually transitioning recesses/projections. For example, in the illustrated embodiment, the last 2 to 6 inches, or about the last 4 inches of each layer 972 can have a double-sided taper (if, e.g., an inner layer 972) or a single-sided taper (if, e.g., an outer layer 972) to a termination 973 of from about 0.0 inch to about 0.07 inch, or about 0.04 inch.

Referring next to FIG. 9E, the inboard end portion 979c of the second spar portion 871b includes a plurality of projections 974 configured to fit into corresponding recesses 975 of the outboard end portion 979b of the first spar portion 871a. Similarly, the inboard end portion 979c also includes a plurality of recesses 975 configured to receive corresponding projections 974 of the outboard end portion 979b of the first spar portion 871a. For example, during manufacture of the spar 170b, the first projection 974a on the outboard end portion 979b of the first spar portion 871a is fit into the corresponding first recess 975a on the inboard end portion 979c of the second spar portion 871b. Although the respective end portions 979 are fit together in this manner during assembly of the spar 170b on the manufacturing assembly 801 of FIG. 8A, the mating end portions 979 are not actually bonded together at this time, so that the blade sections 116 (FIG. 8A) can be separated after manufacture and individually transported to the installation site.

As shown in FIG. 9F, when the outboard end portion 979b of the first spar portion 871a is ultimately joined to the inboard end portion 979c of the second spar portion 871b at the installation site, the alternating projections 974 and recesses 975 create an overlapping or a zigzag bond line 976. As is known to those of ordinary skill in the art, this is a very efficient structural joint, and can avoid or at least reduce the need for further structural reinforcement of the joint between the first spar portion 871a and the second spar portion 871b.

Figure 10A:
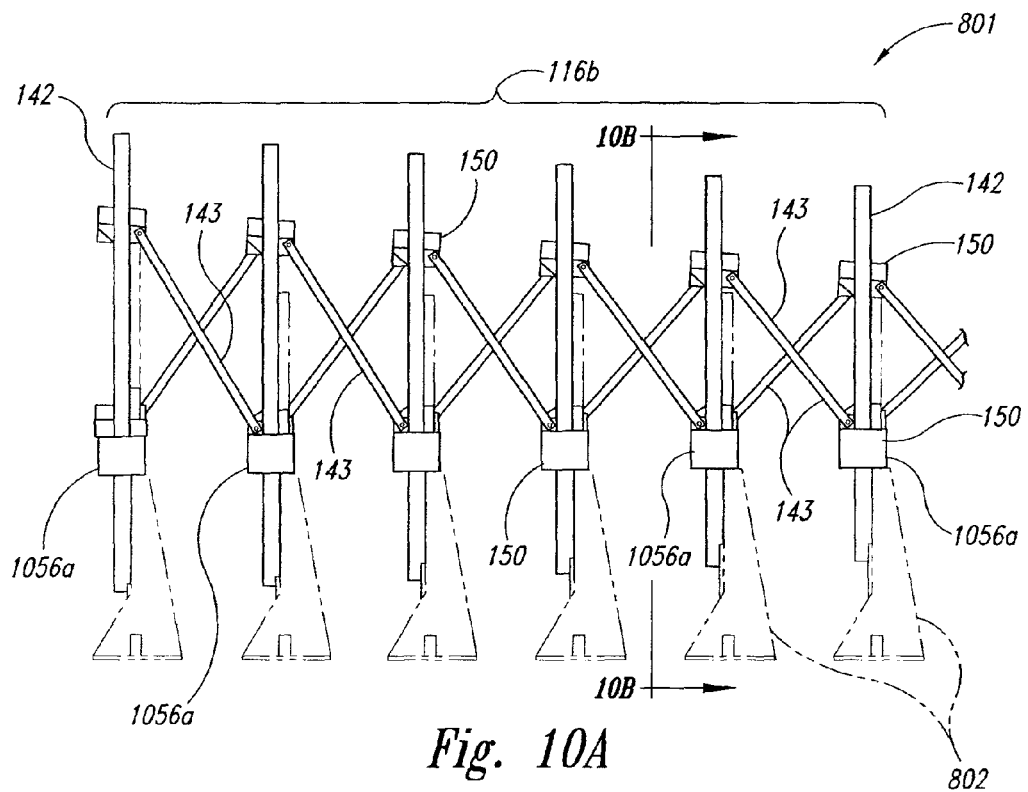
FIGS. 10A and 10C-10E are a series of partially schematic, side elevation views of a portion of a blade subassembly illustrating various stages in a method of manufacturing a blade spar in accordance with an embodiment of the disclosure.
Figure 10B:
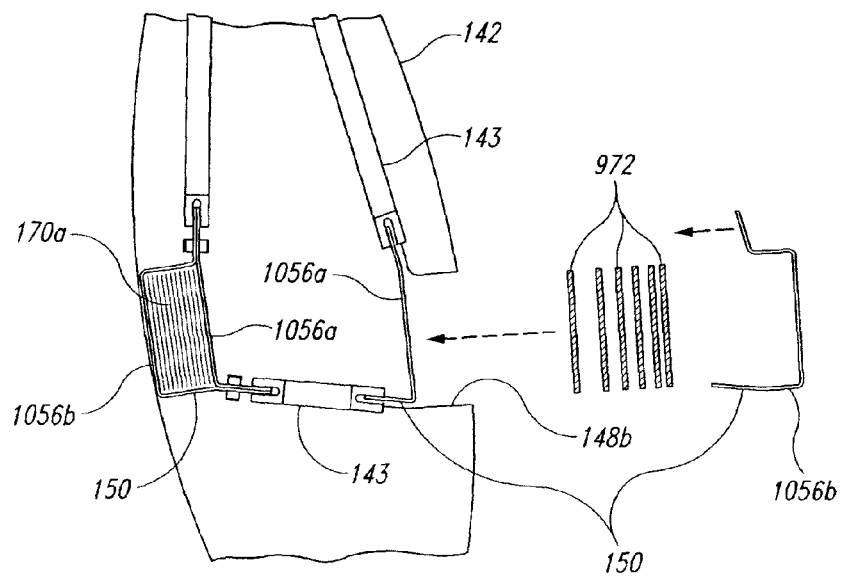
FIG. 10B is an enlarged end view of a portion of a representative rib illustrating another stage in the method of blade manufacture.

FIGS. 10A and 10C-10E are a series of partially schematic side elevation views of a portion of the manufacturing assembly 801 of FIG. 8A, illustrating various stages in a method of manufacturing the spar 170b in situ on the truss structure of the turbine blade 110 in accordance with an embodiment of the disclosure. FIG. 10B is an enlarged end view taken along line 10B-10B in FIG. 10A, further illustrating aspects of this spar manufacturing method. Referring first to FIGS. 10A and 10B together, the ribs 142 have been secured to their corresponding tool stanchions 802, and a plurality of truss members 143 have been installed (at least temporarily) between corresponding truss attachment members 150. Each truss attachment member 150 of the illustrated embodiment includes a first piece 1056a and a mating second piece 1056b. As shown in FIG. 10A, only the first piece 1056a is attached to the truss structure during build-up of the spar 170b. As discussed in more detail below, after all of the spar layers 772 have been properly arranged on the first piece 1056a of the truss attachment member 150, the second piece 1056b is fit into position and secured to the first piece 1056a.

Figure 10C:
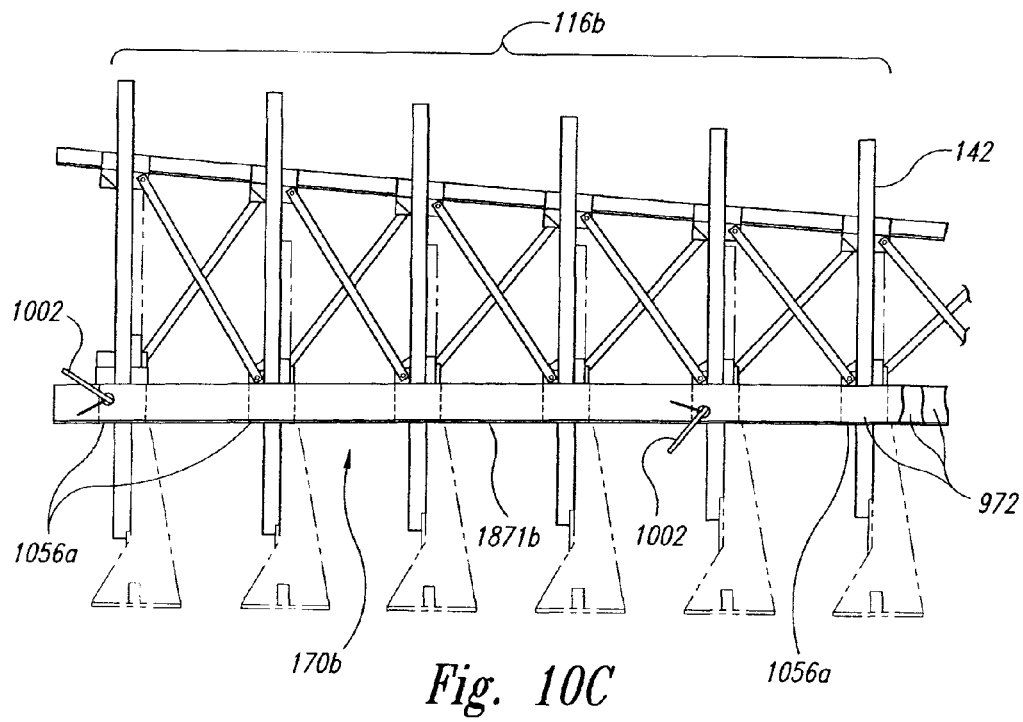

Referring next to FIG. 10C, the individual spar layers 772 are sequentially placed into position on the first piece 1056a of the truss attachment member 150 of each rib 142. As the spar layers 772 are placed on top of each other, the terminations 773 are positioned as shown in FIGS. 7A-7E to produce the desired spar profile. A layer of adhesive (e.g., epoxy adhesive, thermosetting resin adhesive, etc.) can be applied to one or both of the mating surfaces of adjacent layers 772. The spar layers 772 can be temporarily held in position during the stacking process with clamps 1002 (e.g., C-clamps and/or other suitable clamps known in the art).

Figure 10D:
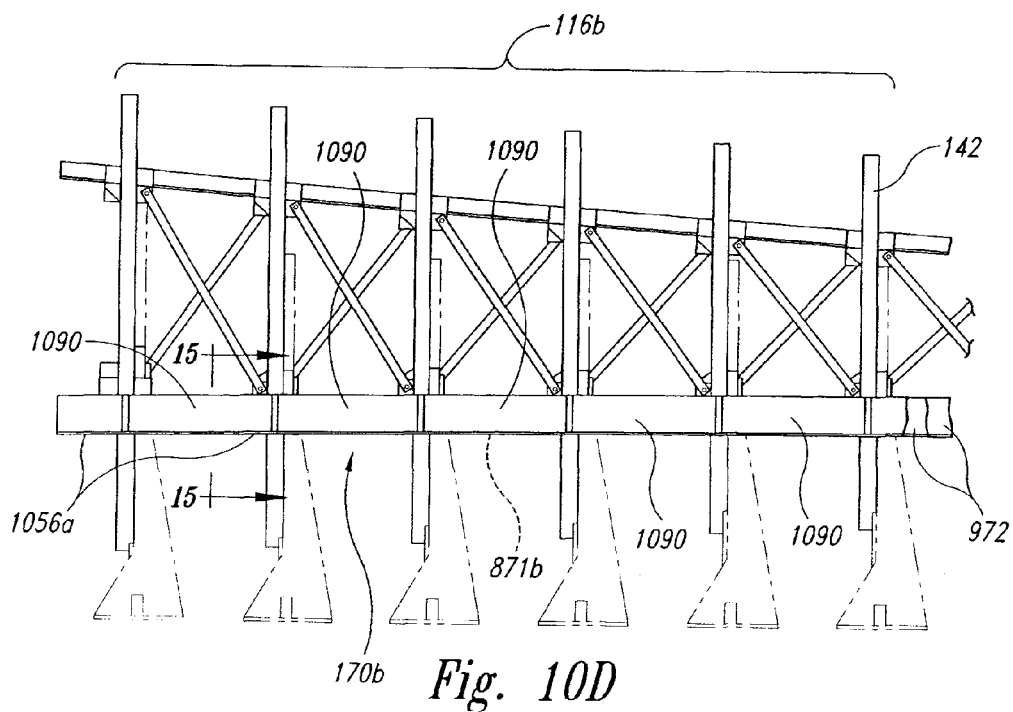

Referring next to FIG. 10D, once all of the layers 772 have been properly arranged on the first pieces 1056a of the truss attachment members 150, the layers 772 can be compressed during the adhesive curing cycle using a suitable clamping tool, such as the compressing apparatus 1090 described in greater detail below. More particularly, a plurality of the compressing apparatuses 1090 can be positioned on the spar portion 871 between the ribs 142 to compress the layers 972 together during the curing process. The compressing apparatus 1090 is described in greater detail below with reference to FIGS. 12A-15.

Figure 10E:
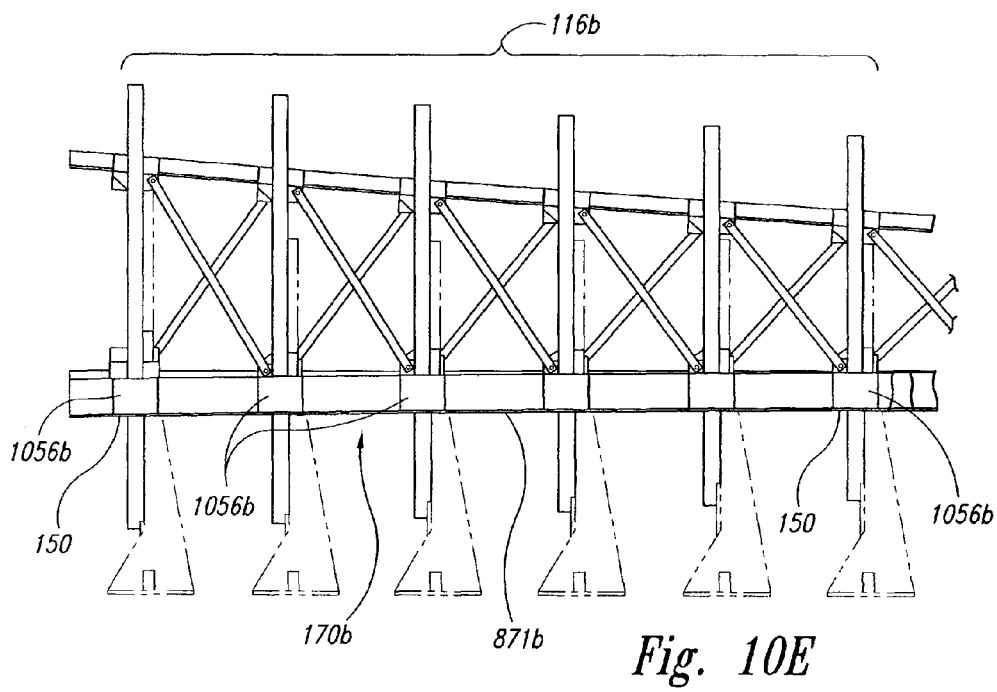

Referring next to FIG. 10E, once the adhesive between the layer's 972 has cured, the second pieces 1056b of each of the truss attachment members 150 can be installed on the truss structure and joined to the corresponding first pieces 1056a with threaded fasteners and/or other suitable methods. In one embodiment, adhesive can be applied between the mating surfaces of the first piece 1056a and the spar portion 871, and/or the second piece 1056b and the spar portion 871, to bond the spar portion 871 to the respective truss attachment members 150. In other embodiments, such adhesive can be omitted.

Figure 11A:
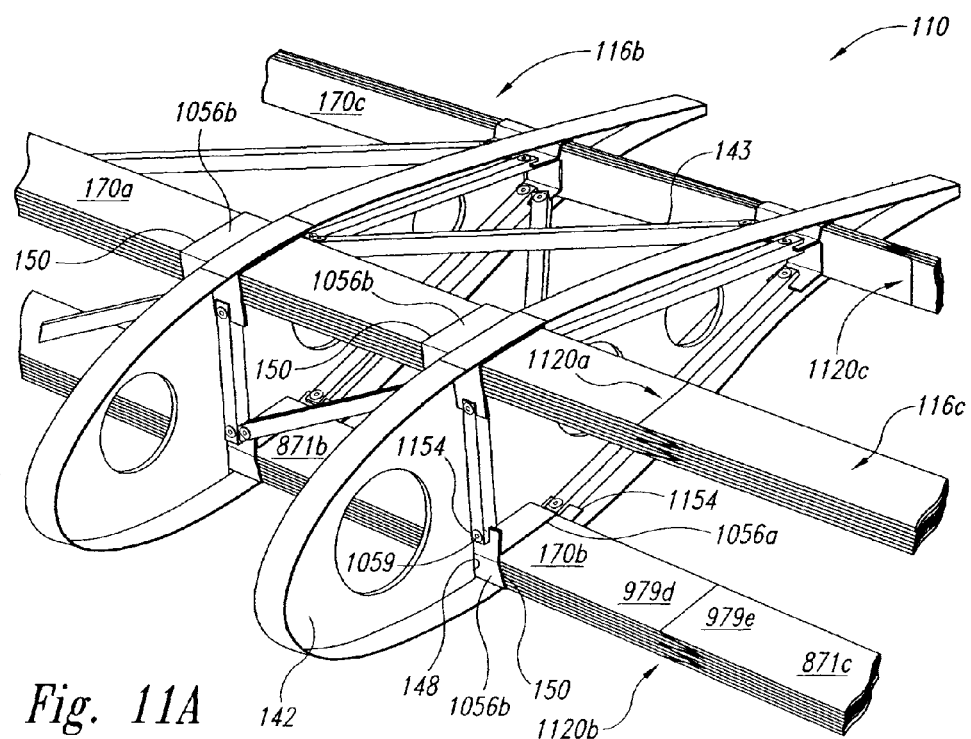
FIGS. 11A-11C are an enlarged isometric view of a portion of a wind turbine blade structure, an end view of a representative rib, and an isometric view of the wind turbine blade structure, respectively, illustrating various aspects of a spar manufactured in accordance with an embodiment of the disclosure.
Figure 11B:
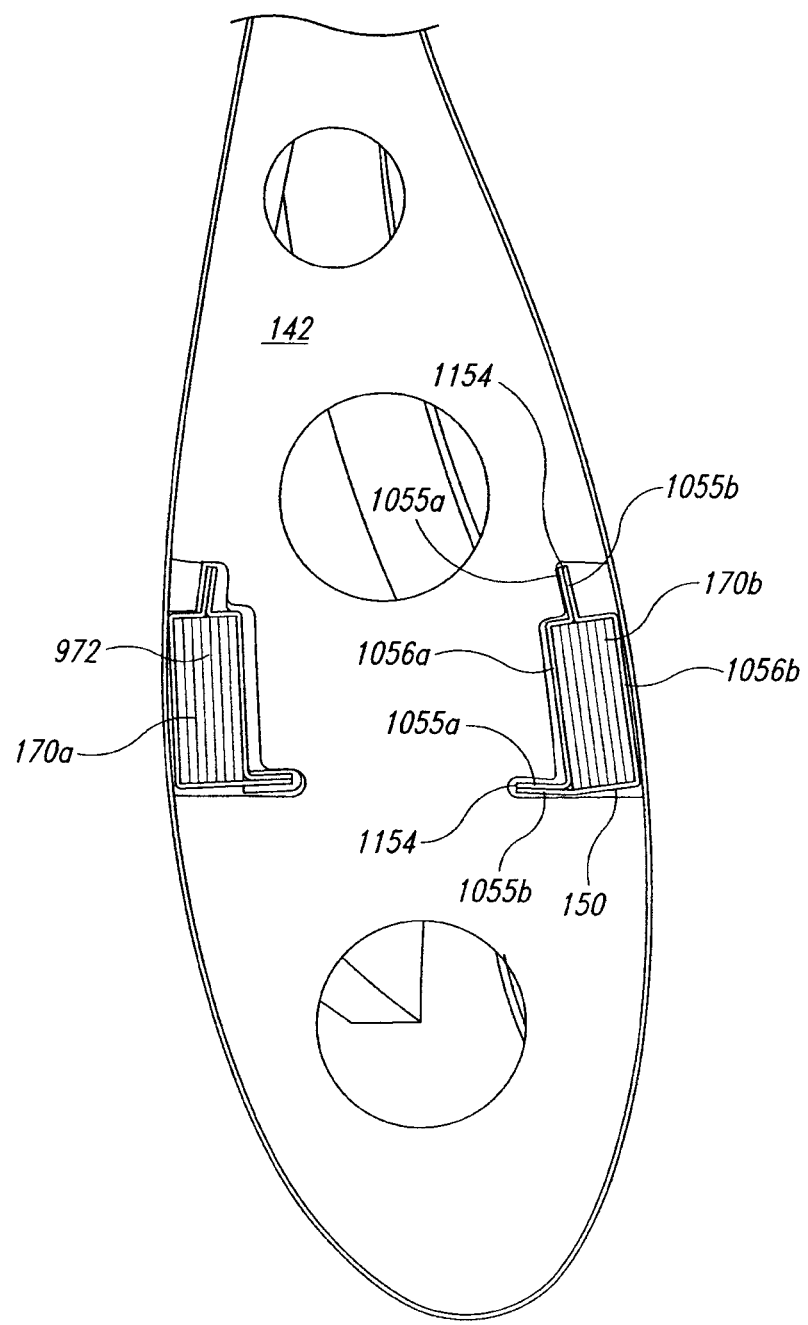

FIG. 11A is an enlarged isometric view of a portion of the truss structure of the turbine blade 110, and FIG. 11B is an end view of a representative rib 142 illustrating aspects of the installed spars 170. In one embodiment, the second piece 1056b of the truss attachment member 150 can be mated to the first piece 1056a by sliding the second piece 1056b sideways into the cutout 148. For this procedure, the end portions of the truss members 143 can be temporarily detached from corresponding truss attachment portions 1154 of the truss attachment member 150. Once both pieces 1056 of the truss attachment member 150 are in their respective positions, the end portions of the truss members 143 can be rejoined to the truss attachment portions 1154. In one embodiment, the end portions of the truss members 143 and the corresponding truss attachment portions 1154 can be pilot drilled undersize, and then drilled full size during final assembly. Moreover, the end portions of the truss numbers 143 can be attached to the truss attachment portions 1154 by fasteners 859 that are frozen before installation in the corresponding fastener holes so that they expand to a press fit after installation. In other embodiments, the truss members 143 can be attached to the truss attachment members 150 using other suitable methods known in the art.

Figure 11C:
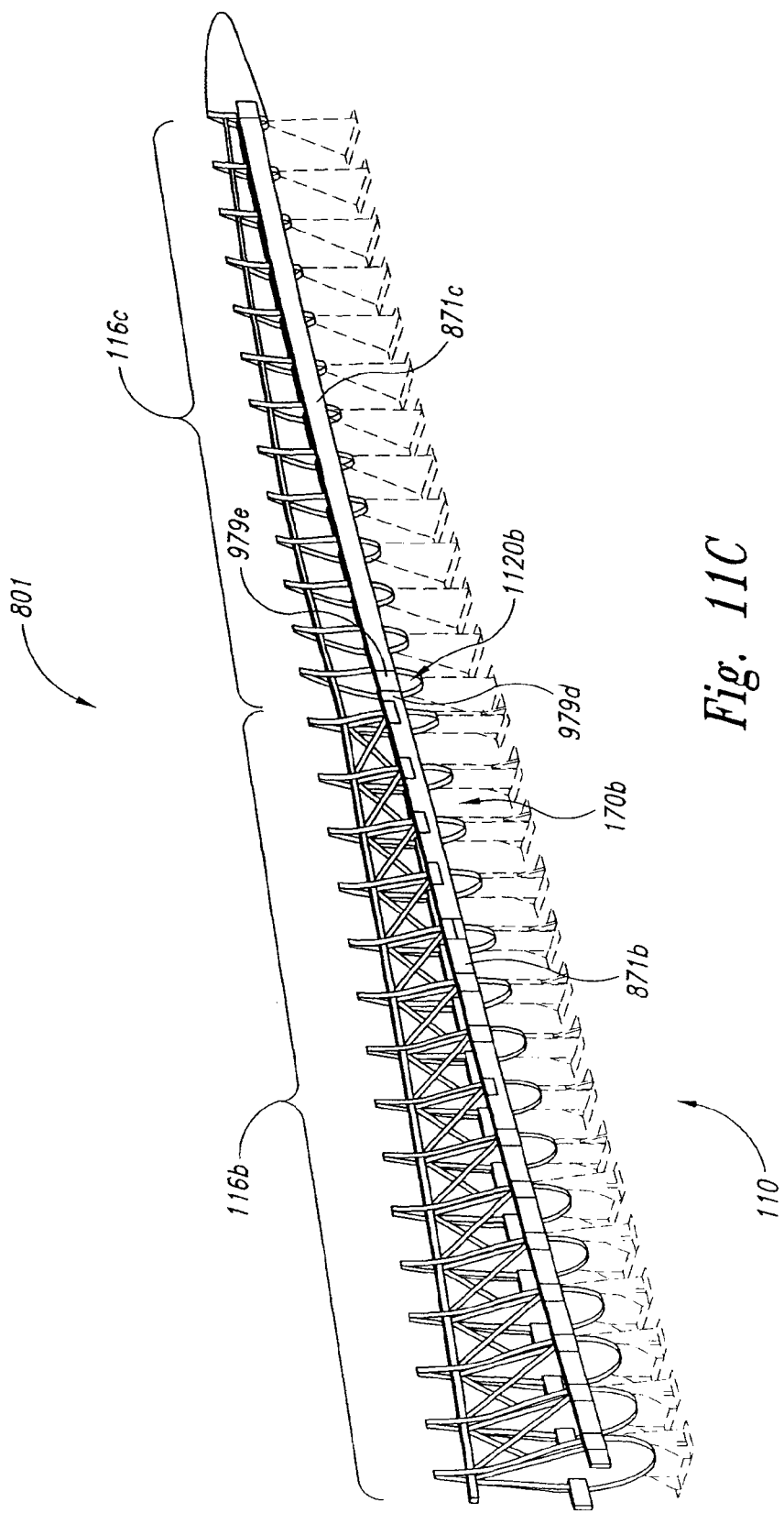

FIG. 11C is a partially schematic isometric view of a portion of the manufacturing assembly 801 after the spar 170b has been fully assembled and installed on the truss structure of the turbine blade 110. Referring to FIGS. 11A and 11C together, although the mating end portions 979 of the second spar portion 871b and the third spar portion 871c are assembled in place to ensure that they will fit neatly together during final assembly, the end portions 979 are not bonded during truss manufacture. This enables the second blade section 116b and the third blade section 116c to be separated from each other at the manufacturing facility for transportation to the installation site. Accordingly, in the illustrated embodiment the end portions 979 of the spar portions 871 are not bonded together during the manufacturing process, but instead form separation joints 1120 where the spars 170 will be joined together when the turbine blade 110 is assembled on site. In one embodiment, the spars can be joined together on site using the systems and methods described in detail in U.S. Provisional Patent Application No. 61/180,816, filed May 22, 2009 and incorporated herein in its entirety by reference. The blade segments can be transported to the site using systems and methods described in detail in U.S. Provisional Patent Application No. 61/180,812, filed May 22, 2009 and incorporated herein in its entirety by reference.

Figure 12A:
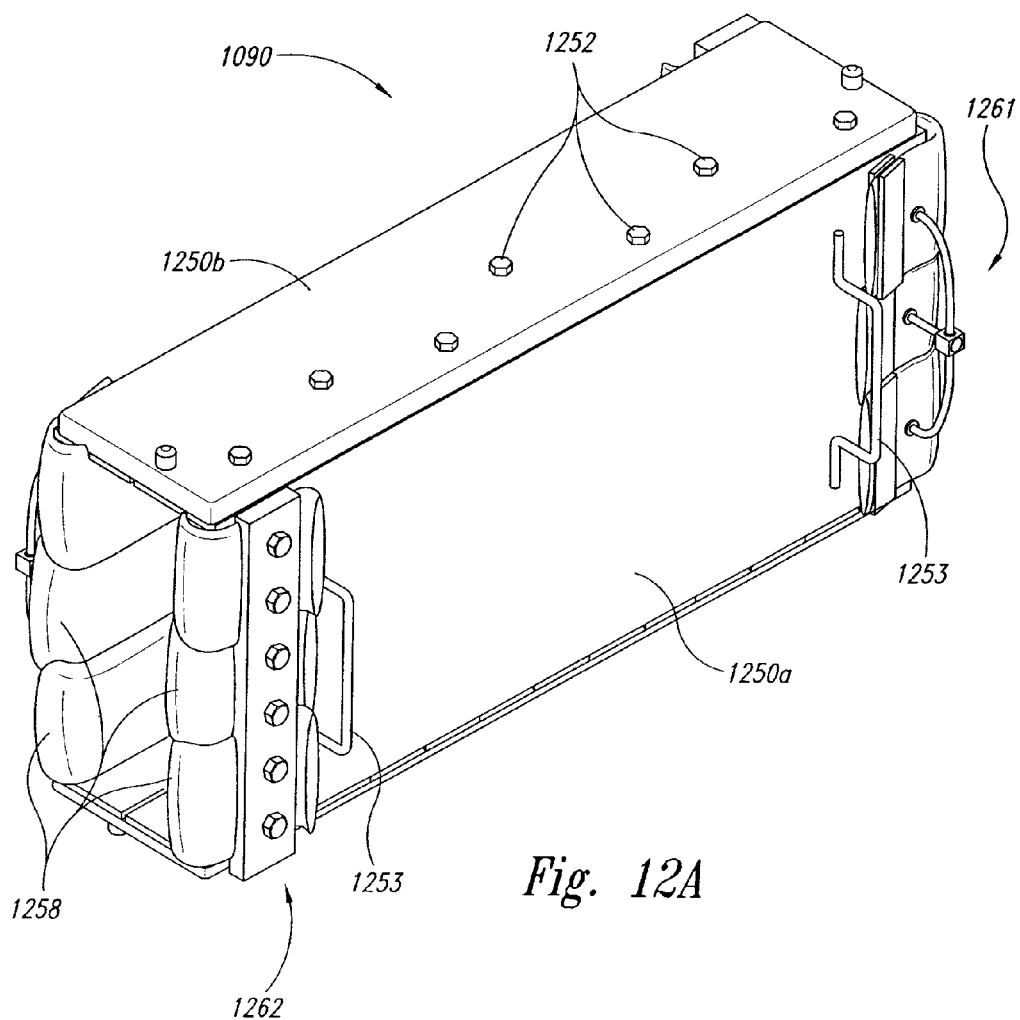
FIG. 12A is an isometric view of a compressing apparatus configured in accordance with an embodiment of the disclosure.
Figure 12B:
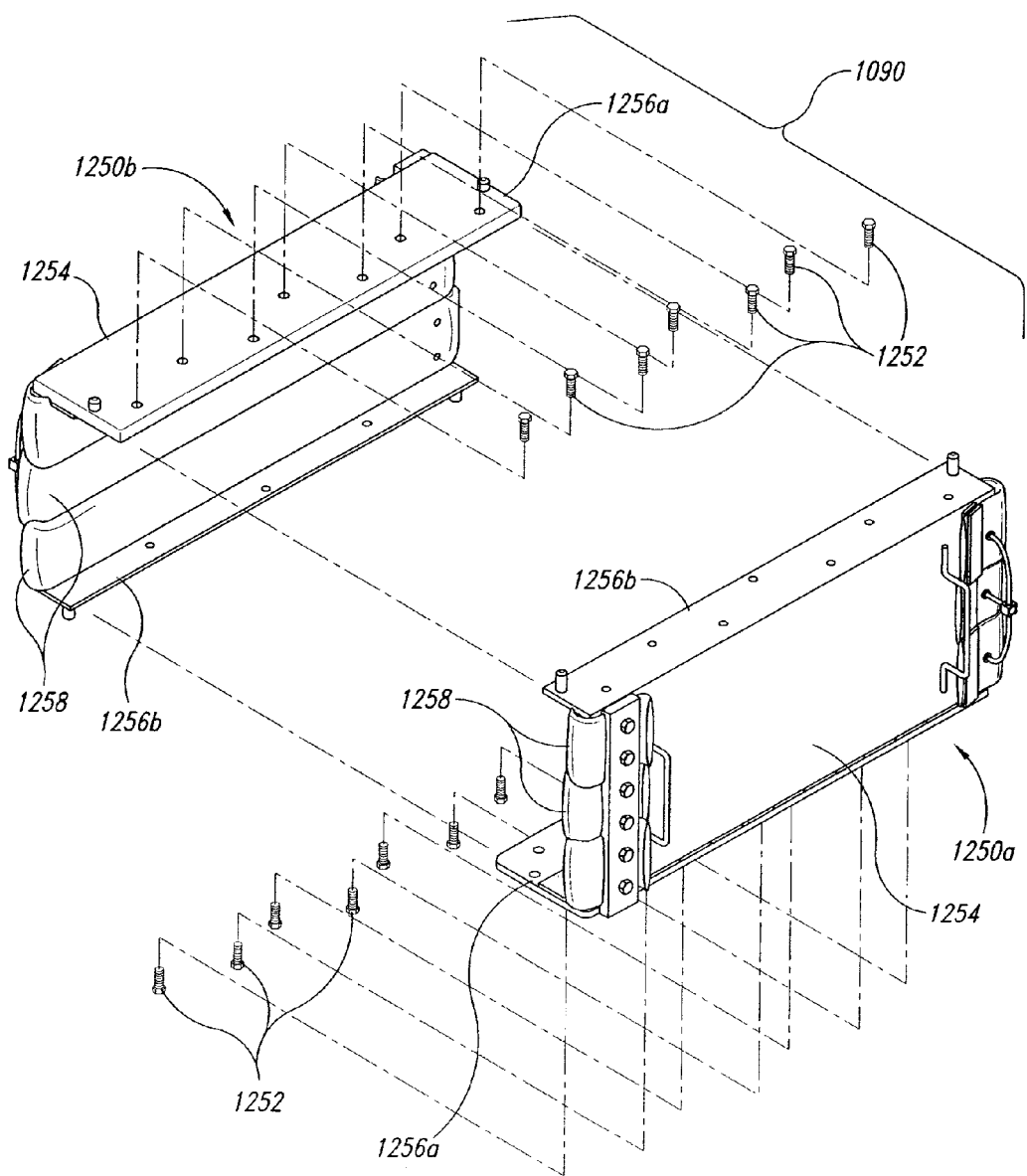
FIG. 12B is a partially exploded isometric view of the compressing apparatus of FIG. 12A.

FIG. 12A is an isometric view of the compressing apparatus 890 configured in accordance with an embodiment of the disclosure, and FIG. 12B is a partially exploded isometric view of the compressing apparatus 1090. Referring to FIGS. 12A and 12B together, the compressing apparatus 1090 includes a first tool portion 1250a and a second tool portion 1250b. In the illustrated embodiment, the tool portions 1250 are mirror images of each other, or are at least very similar to each other. Each tool portion 1250 includes a support plate 1254 and opposing side flanges 1256 (identified individually as a first side flange 1256a and a second side flange 1256b) extending therefrom. As described in greater detail below, the tool portions 1250 are configured to fit together in a clamshell arrangement around a portion of the laminated spar 170 to compact and compress the spar layers (e.g., the layers 772) together while the adhesive between the layers cures. More particularly, each of the tool portions 1250 includes one or more expandable members 1258 configured to expand inwardly from the support plate 1254 to thereby compress the corresponding spar section during the curing process. In the illustrated embodiment, the first side flange 1256a is somewhat wider than the second side flange 1256b, so that the mating flanges 1256 can overlap and be temporarily held together with fasteners 1252 (e.g., threaded fasteners, such as bolts, screws, etc.) during the compressing and curing process. Each tool portion 1250 can also include a first end portion 1261 and an opposing second end portion 1262. Handles 1253 can be provided on the end portions 1261 and 1262 to facilitate manual placement, installation and/or removal of the tool portions 1250. The tool portions 1250 can be manufactured from various materials having sufficient strength, stiffness, and manufacturing characteristics. For example, in one embodiment the tool portions 1250 can be formed from aluminum that is machined, welded, or otherwise formed to the desired shape. In other embodiments, the tool portions 1250 can be fabricated from other suitable metals including steel, brass, etc., as well as suitable non-metallic materials such as composite materials.

Figure 13A:
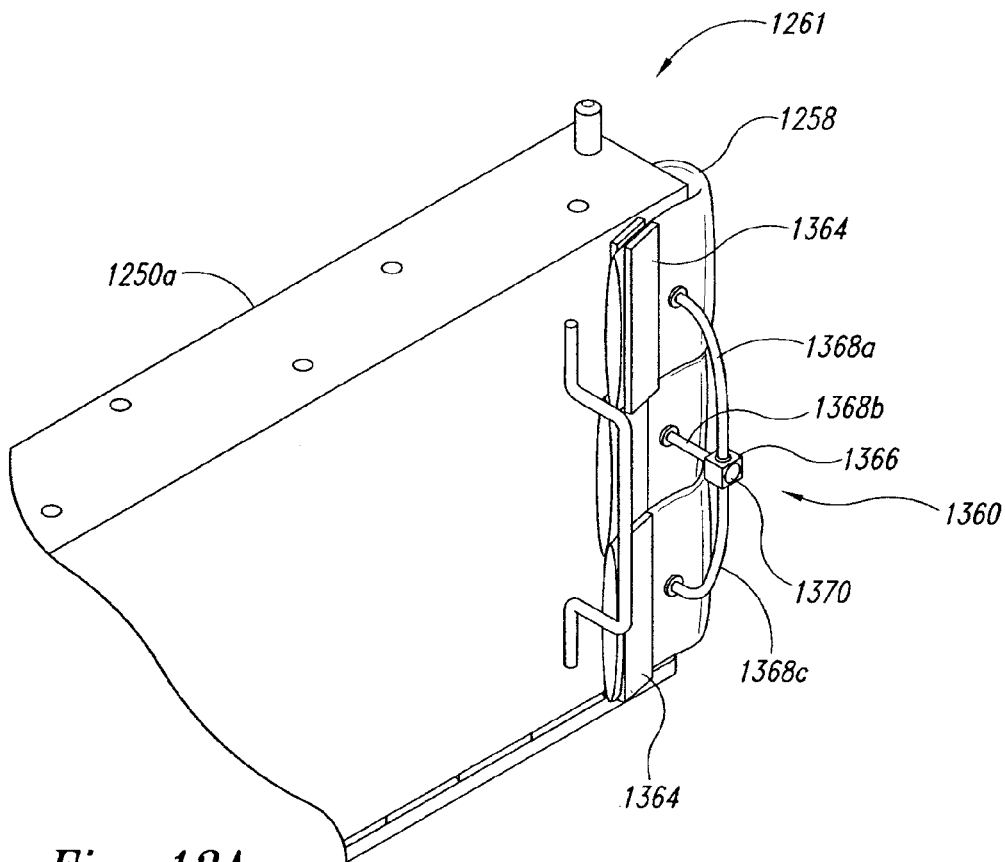
FIGS. 13A and 13B are enlarged isometric views of opposing end portions of a first tool portion of the compressing apparatus of FIGS. 12A and 12B.
Figure 13B:
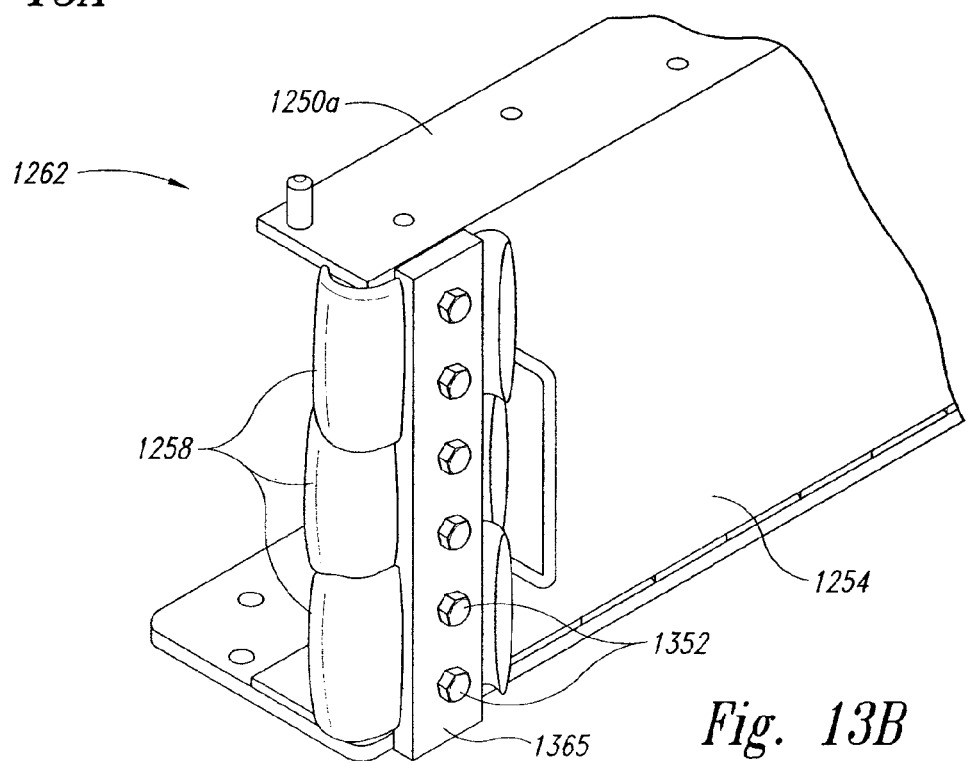

FIG. 13A is an exploded isometric view of the first end portion 1261 of the first tool portion 1250a, and FIG. 13B is an enlarged isometric view of the second end portion 1262. Referring first to FIG. 13A, each tool portion 1250 includes a manifold 1360 for filling and unfilling the expandable members 1258 with a fluid (e.g., compressed air). In the illustrated embodiment, a conduit 1368 (identified individually as conduits 1368a-c) extends between each expandable member 1258 and a fill/drain fitting 1366. The fill/drain fitting 1366 can include a threaded orifice 1370 or other feature (e.g., a high-pressure air coupling) configured to receive a corresponding fitting for flowing fluid into the respective expandable members 1258 through the conduits 1368. In one embodiment, for example, the expandable members 1258 can be filled with compressed air to inflate the expandable members 1258 and thereby compress the layers of the spar 170 together during the curing cycle. In other embodiments, the expandable members 1258 can be filled with other types of gas or liquids (e.g., water, oil, etc.) to inflate the expandable members 1258 and compress the spar layers together.

The proximal end portions of the expandable members 1258 can include an end closure 1364 to seal the expandable member 1258 and maintain pressure. In the illustrated embodiment, the end closures 1364 can include two or more plates that sandwich the end portion of the expandable member 1258 therebetween to prevent leakage. In other embodiments, other structures and systems can be used to seal the proximal end portions of the expandable members 1258. As shown in FIG. 13B, the distal end portions of the expandable members 1258 can be closed off and sealed with a suitable end closure plate 1365 that is fastened to the support plate 1254 with a plurality of fasteners 1352. In other embodiments, the end portions of the expandable members 1258 can be secured to the tool portion 1250 and/or closed off and sealed using other suitable means.

Figure 14A:
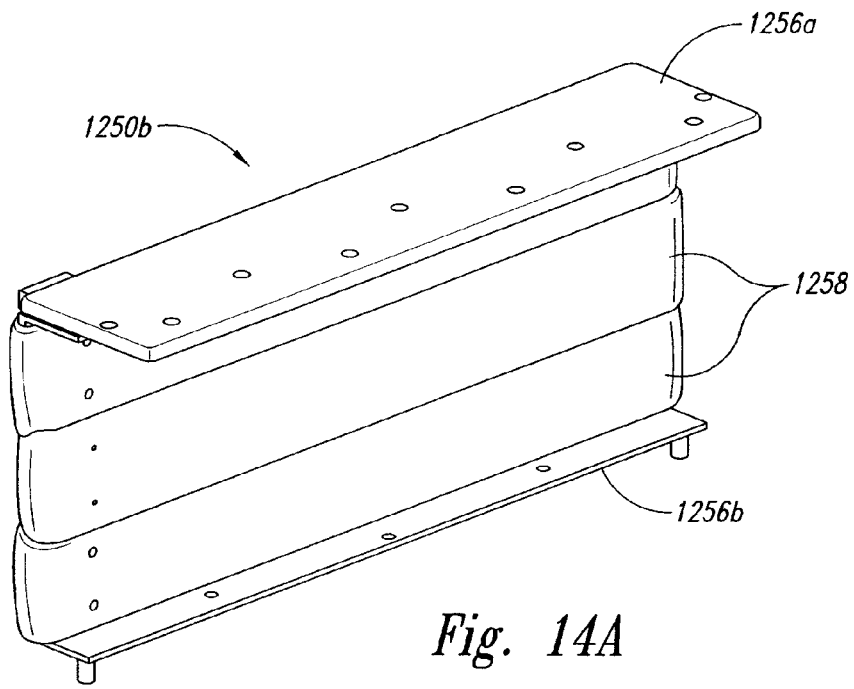
FIG. 14A is an isometric view of a second tool portion of the compressing apparatus of FIGS. 12A and 12B.
Figure 14B:
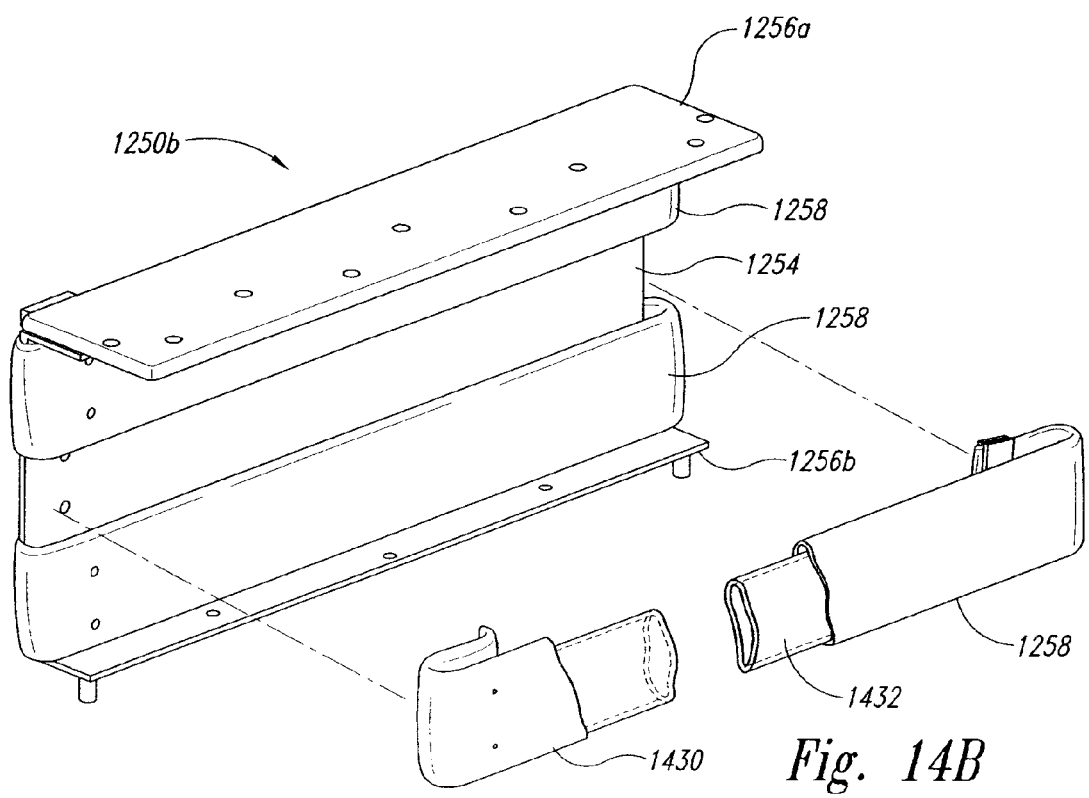
FIG. 14B is a partially exploded isometric view of the second tool portion of FIG. 14A.

FIG. 14A is an enlarged isometric view of the second tool portion 1250*b*, and FIG. 14B is a partially exploded isometric view of the second tool portion 1250*b*. With reference to FIG. 14B, each of the expandable members 1258 can include a flexible tubular structure comprised of an outer layer 1430 and an inner layer 1432. The outer layer 1430 can include a suitable material to provide strength to the expandable member 1258, and the inner layer 1432 can include a suitable material for sealing the expandable member 1258. For example, the inner sealing layer 1432 can include a rubber liner, and the outer layer 1430 can include woven nylon, fiberglass, etc. Accordingly, in one embodiment the expandable member 1258 can include a structure that is at least generally similar in structure and function to a fire hose. In other embodiments, the expandable members 1258 can include other materials and have other structures.

Figure 15:
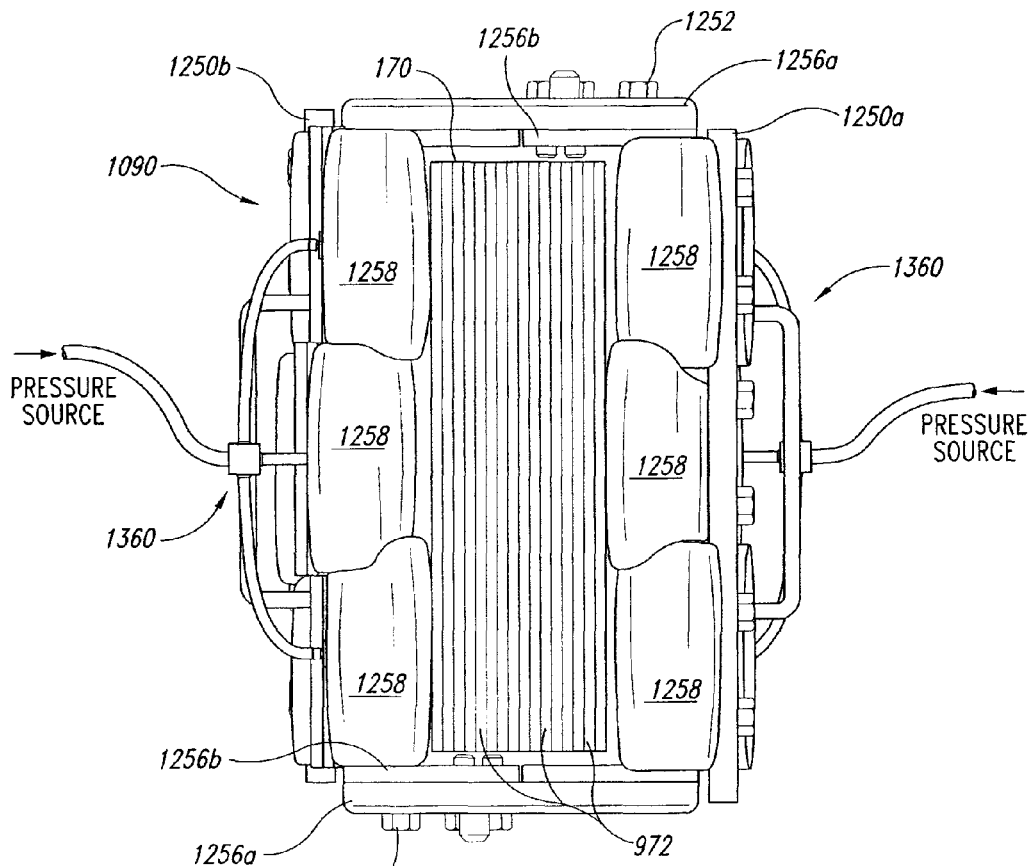
FIG. 15 is an enlarged, cross-sectional end view of a laminated blade spar being compressed by the compressing apparatus of FIGS. 12A and 12B during an adhesive curing cycle in accordance with an embodiment of the disclosure.

FIG. 15 is an enlarged end view taken substantially along line 15-15 in FIG. 10D illustrating use of the compressing apparatus 1090 in accordance with an embodiment of the disclosure. In this view, the spar layers 972 have been appropriately positioned on the truss substructure, with bonding adhesive between the layers. The first tool portion 1250*a* has been positioned on one side of the spar 170, and the second tool portion 1250*b* has been positioned on the other side. Each first flange 1256*a* of each tool portion 1250 overlaps the corresponding second flange 1256*b* of the opposing tool portion 1250. Once the two tool portions 1250 have been properly positioned, the tool portions 1250 are temporarily attached with the fasteners 1252. A pressure source (e.g. a source of compressed air) is then attached to the manifold 1360 on each tool portion 1250, and the expandable members 1258 are inflated to a sufficient pressure. As they expand, the expandable members 1258 provide an even, distributed pressure over the laminated spar 170. The pressure can be modulated as required to provide a desired level of compaction and compression during the curing process. Moreover, a suitable vacuum bag or other thin film protective layer can be wrapped around the spar 170 to avoid getting adhesive on the compressing apparatus 1090. After the spar 170 has suitably cured, the compressing apparatus 1090 can be disassembled by relieving the pressure in the expandable members 1258 and removing the fasteners 1252.

The methods and systems described in detail above can be used to assemble a wind turbine blade spar in situ on a manufacturing subassembly in accordance with embodiments of the disclosure. More particularly, several embodiments of the disclosure have been described in detail above for manufacturing laminated spars using pultruded composite materials, such as pultruded composite "planks." There are a number of advantages associated with some of these embodiments. These advantages can include, for example, lower cost and lower weight wind turbine blades as compared to conventional manufacturing techniques. Moreover, use of pultrusions can reduce dimensional variations in the finished parts.

In certain embodiments, other turbine blade structures, such as outer skins, ribs, truss members, etc. can be formed from pultruded composite materials. For example, in one embodiment skins can be formed from one or more pultruded composite members (e.g., sheets) that are laminated together. In other embodiments, truss members can be formed from composite pultrusions. Accordingly, the methods and systems disclosed herein for forming turbine blade structures from pultruded materials are not limited to use with turbine blade spars or spar caps, but can be used to form other turbine blade structures.

Figure 16:
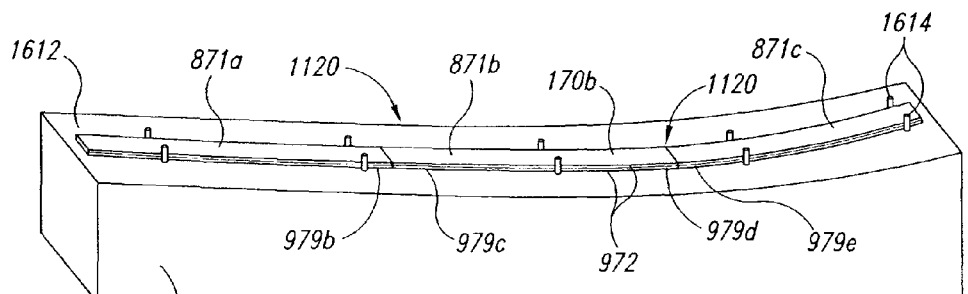
FIG. 16 is a partially schematic isometric view of a lay-up tool illustrating various stages in a method of manufacturing a wind turbine blade spar in accordance with another embodiment of the disclosure.

In other embodiments, however, turbine blade spars and/or other blade structures, such as the spars 170 described herein, can be manufactured from pultruded composite materials using a suitable production tool. FIG. 16, for example, illustrates a tool 1610 having a mold surface 1612 with an appropriate contour for the spar 170*b*. To manufacture the spar 170*b* on the tool 1610, the layers 972 (e.g., pultruded planks) are sequentially positioned on the mold surface 1612. Tooling pins 1614 and/or other locators can be used to accurately position the layers 972. The layers 972 can be precut to the appropriate lengths so that when arranged on the tool surface 1612, the respective end portions 979 form the desired zigzagging joint or overlapping fingers. Although no adhesive is used between the mating end portions 979 at this time, each layer 972 is covered with adhesive prior to installation on the tool 1610. After all the layers 972 have been placed on the tool surface 1612, the lay up can be vacuum-bagged to extract the air from the laminate and compress the layers 972 together. The spar can be cured at room temperature, or heat can be applied via an autoclave or other means if desired for the particular adhesive used.

From the foregoing, it will be appreciated that specific embodiments have been described herein for purposes of illustration, but that the invention maybe include other embodiments as well. For example, features described above with reference to FIG. 7A in the context of four spanwise extending spars can be applied to wind turbine blades having other numbers of spars, including three spars. In addition, the truss structures described above can have arrangements other than those specifically shown in the Figures. The attachments between spars, ribs, and truss members can have arrangements other than those described above. Certain aspects of the disclosure described in the context of particular embodiments may be combined or eliminated in other embodiments. Further, while advantages associated with certain embodiments have been described in the context of those embodiments, other embodiments may also exhibit such advantages, and not all embodiments need necessarily exhibit such advantages to fall within the scope of the disclosure. Accordingly, the invention can include other embodiments not explicitly shown or described above. Therefore, the invention is not limited, except as by the appended claims.

We claim:

1. A wind turbine blade, comprising:
   an external aerodynamic surface having a longitudinally-extending spanwise axis, a chordwise axis extending transverse to the spanwise axis, and a thickness axis extending transverse to both the chordwise and spanwise axes; and
   a plurality of longitudinally-extending spars providing internal support for the aerodynamic surface, wherein at least one of the spars includes a laminate of precured composite material, the laminate of precured composite material including:
   a plurality of precured, pultruded composite layers, wherein each of the pultruded composite layers overlaps with the others in the at least one spar at at least one longitudinal location; and
   a plurality of adhesive layers interposed between adjacent precured, pultruded composite layers.

2. The wind turbine blade of claim 1 wherein each of the precured, pultruded composite layers includes a precured fiber-reinforced resin product.

3. The wind turbine blade of claim 1 wherein the aerodynamic surface defines an airfoil cross-section, wherein the plurality of longitudinally-extending spars include a pressure spar and a suction spar spaced apart from each other along the thickness axis, and an aft spar spaced apart from both the pressure and suction spars along the chordwise axis, and wherein each of the pressure, suction and aft spars are comprised of a laminate of precured composite pultrusions.

4. The wind turbine blade of claim 1, further comprising a plurality of longitudinally spaced-apart ribs, and wherein the at least one spar is attached to the ribs.

5. The wind turbine blade of claim 1, further comprising a strap clamped circumferentially around the plurality of precured, pultruded composite layers.

6. The wind turbine blade of claim 1, further comprising:
a plurality of longitudinally spaced-apart ribs; and
a plurality of truss attachment members, wherein each of the truss attachment members includes a first piece and a corresponding second piece, wherein each of the first pieces is attached to the corresponding second piece to clamp a portion of the precured composite layers together therebetween, and wherein at least one of the first piece and the second piece of each truss attachment member is attached to one of the longitudinally spaced apart ribs.

7. The wind turbine blade of claim 1 wherein the at least one spar tapers in at least an outboard direction, and wherein the taper results from precured, pultruded composite layers terminating at different longitudinal locations.

8. The wind turbine blade of claim 1 wherein individual precured, pultruded composite layers terminate at different longitudinal locations.

9. The wind turbine blade of claim 1 wherein individual precured, pultruded composite layers terminate at different longitudinal locations, and wherein the terminations are chamfered.

10. The wind turbine blade of claim 1 wherein individual precured, pultruded composite layers have a chordwise extent and a thickness extent less than the chordwise extent.

11. The wind turbine blade of claim 1 wherein individual precured, pultruded composite layers are flat along the chordwise axis.

12. The wind turbine blade of claim 1 wherein individual precured, pultruded composite layers are formed separately from the external aerodynamic surface.

13. The wind turbine blade of claim 1 wherein inner and outer surfaces of the at least one spar are generally parallel to a mean slope of the local external aerodynamic surface.

14. The wind turbine blade of claim 13 wherein the inner and outer surfaces of the at least one spar are generally flat and wherein the local external aerodynamic surface is curved.

15. A wind turbine blade, comprising:
an external aerodynamic surface having a longitudinally-extending spanwise axis, a chordwise axis extending transverse to the spanwise axis, and a thickness axis extending transverse to both the chordwise and spanwise axes; and
a plurality of longitudinally-extending spars providing internal support for the aerodynamic surface, wherein at least one of the spars has inner and outer surfaces that are generally flat and wherein the local external aerodynamic surface is curved, further wherein the at least one spar includes a laminate of precured composite material, the laminate of precured composite material including:
a plurality of precured, pultruded composite layers, wherein each of the pultruded composite layers overlaps with the others in the at least one spar at at least one longitudinal location, and wherein individual precured, pultruded composite layers have a chordwise extent and a thickness extent less than the chordwise extent; and
a plurality of adhesive layers interposed between adjacent precured, pultruded composite layers.

16. The wind turbine blade of claim 15 wherein individual precured, pultruded composite layers terminate at different longitudinal locations.

17. The wind turbine blade of claim 16 wherein the terminations are chamfered.

18. The wind turbine blade of claim 17 wherein the terminations are staggered to form a tapered shape along the longitudinal axis.

* * * * *